United States Patent
Kwon

(10) Patent No.: US 11,214,244 B2
(45) Date of Patent: Jan. 4, 2022

(54) VEHICLE COLLISION AVOIDANCE CONTROL DEVICE AND METHOD FOR CONTROLLING SAME

(71) Applicant: MANDO CORPORATION, Pyeongtaek-si (KR)

(72) Inventor: Young Ju Kwon, Gwangju-si (KR)

(73) Assignee: Mando Corporation, Pyeongtaek-si (KR)

(*) Notice: Subject to any disclaimer, the term of this patent is extended or adjusted under 35 U.S.C. 154(b) by 0 days.

(21) Appl. No.: 16/216,722

(22) Filed: Dec. 11, 2018

(65) Prior Publication Data
US 2019/0329762 A1    Oct. 31, 2019

(30) Foreign Application Priority Data
Apr. 25, 2018 (KR) ........................ 10-2018-0048140

(51) Int. Cl.
*B60W 30/09* (2012.01)
*B60Q 1/52* (2006.01)
(Continued)

(52) U.S. Cl.
CPC .............. *B60W 30/09* (2013.01); *B60Q 1/525* (2013.01); *B60W 30/0956* (2013.01);
(Continued)

(58) Field of Classification Search
CPC ...... B60W 30/09; B60W 30/16; B60W 10/00; B60W 10/18; B60W 30/0956;
(Continued)

(56) References Cited

U.S. PATENT DOCUMENTS

| 5,983,161 A | * | 11/1999 | Lemelson ............... G01S 19/11 340/436 |
| 2014/0309884 A1 | | 10/2014 | Wolf |

(Continued)

FOREIGN PATENT DOCUMENTS

| DE | 102004056120 A1 | 5/2006 |
| DE | 102006024204 A1 | 6/2007 |

(Continued)

OTHER PUBLICATIONS

Extended European Search Report dated Aug. 26, 2019 issued in European Patent Application No. 19165833.5.
(Continued)

*Primary Examiner* — Isaac G Smith
(74) *Attorney, Agent, or Firm* — Morgan, Lewis & Bockius LLP

(57) ABSTRACT

The present disclosure provides a vehicle collision avoidance control device including: at least one first sensor configured to sense a first direction of a driver vehicle and to sense a first target vehicle in the first direction of the driver vehicle; at least one second sensor configured to sense a second direction that is opposite to the first direction of the driver vehicle and to sense a second target vehicle in the second direction of the driver vehicle; and a controller configured to output a vehicle control signal at least partially on the basis of processing of the first sensor and the second sensor, wherein the controller is configured to generate a primary vehicle control signal for avoiding a primary collision when a primary collision with the first target vehicle is predicted according to a first direction sensing result by the at least one first sensor, to modify the primary vehicle control signal into a secondary vehicle control signal on the basis of a result of sensing the second target vehicle by the at least one second sensor, and to output the secondary vehicle control signal.

26 Claims, 15 Drawing Sheets

<Primary collision prevention>

<Secondary collision prevention>

Second direction ⟵⟶ First direction

(51) Int. Cl.
*B60W 30/095* (2012.01)
*B60W 30/18* (2012.01)
*G08G 1/16* (2006.01)

(52) U.S. Cl.
CPC ....... *B60W 30/18163* (2013.01); *G08G 1/161* (2013.01); *G08G 1/166* (2013.01); *B60W 2554/4041* (2020.02); *B60W 2554/801* (2020.02); *B60W 2554/804* (2020.02)

(58) Field of Classification Search
CPC . B60W 30/18163; G08G 1/166; G08G 1/161; B60Q 1/525
USPC .................................... 701/41, 301, 48, 70
See application file for complete search history.

(56) References Cited

U.S. PATENT DOCUMENTS

| | | | | |
|---|---|---|---|---|
| 2018/0281791 A1* | 10/2018 | Fukaya | ................ | B60W 30/16 |
| 2019/0202450 A1* | 7/2019 | Maeda | ................ | B60W 30/09 |

FOREIGN PATENT DOCUMENTS

| | | |
|---|---|---|
| DE | 102006059915 A1 | 7/2008 |
| DE | 102016216530 A1 | 5/2017 |
| EP | 1992538 A2 | 11/2008 |
| JP | 2010-162927 A | 7/2010 |
| JP | 2011143744 A | 7/2011 |
| JP | 2011-227587 A | 11/2011 |
| JP | 5040789 B2 | 10/2012 |
| KR | 10-2016-0069417 A | 6/2016 |
| KR | 10-2016-0091040 A | 8/2016 |
| KR | 10-1752424 | 6/2017 |
| KR | 10-2017-0077769 A | 7/2017 |

OTHER PUBLICATIONS

Office Action issued in corresponding Korean Application No. 10-2018-0048140, dated Jun. 24, 2019.
Notice of Allowance dated May 21, 2020 in Korean Patent Application No. 10-2018-0048140.

* cited by examiner

<Primary collision prevention>

<Secondary collision prevention>

Second direction ⟵⟶ First direction

<Primary collision prevention>

<Secondary collision prevention>

Second direction ◄─────► First direction

<Primary collision prevention>

<Secondary collision prevention>

Second direction ◄──────► First direction

<Primary collision prevention>

<Secondary collision prevention>

Second direction ◀――――▶ First direction

<Primary collision prevention>

<Secondary collision prevention>

Second direction ← → First direction

<Primary collision prevention>

<Secondary collision prevention>

Second direction ◄──────► First direction

<Primary collision prevention>

<Secondary collision prevention>

Second direction ←――――→ First direction

VEHICLE COLLISION AVOIDANCE CONTROL DEVICE AND METHOD FOR CONTROLLING SAME

CROSS REFERENCE TO RELATED APPLICATION

This application claims priority from Korean Patent Application No. 10-2018-0048140, filed on Apr. 25, 2018, which is hereby incorporated by reference for all purposes as if fully set forth herein.

BACKGROUND OF THE INVENTION

1. Field of the Invention

The present disclosure relates to a vehicle collision avoidance control device, a vehicle collision avoidance control system, and a method for controlling the same.

2. Description of the Prior Art

In general, a vehicle is equipped with a sensing device capable of recognizing an object outside the vehicle, and a device that controls the vehicle. Such devices assist the driver's traveling such that the driver can travel safely.

The above-mentioned devices perform and terminate vehicle control operations corresponding to various situations occurring during traveling, respectively. For example, when an object is sensed in front of the traveling driver vehicle, the device that controls the vehicle outputs a braking control signal, and, when the driver vehicle stops, the braking control operation is ended. However, there is a problem in that, once the braking control operation is ended, no follow-up measure can be performed quickly with regard to a vehicle approaching the driver vehicle in the opposite direction of the traveling direction.

SUMMARY OF THE INVENTION

In this background, an aspect of the present disclosure is to provide a vehicle collision avoidance device and a method for controlling the same, wherein vehicle collision risks both in the traveling direction and in the opposite direction of the traveling direction can be prevented, thereby securing traveling safety.

Another aspect of the present disclosure is to provide a vehicle collision avoidance device and a method for controlling the same, wherein, by preventing a series of rear-end collisions, smooth traffic flow or vehicle traveling is guaranteed, thereby reducing fuel consumption and the amount of exhaust gas.

In accordance with an aspect of the present disclosure, there is provided a vehicle collision avoidance control device including: a first sensor configured to sense a first direction of a driver vehicle and to sense objects in the first direction of the driver vehicle; at least one second sensor configured to sense a second direction that is opposite to the first direction of the driver vehicle and to sense objects in the second direction of the driver vehicle; and a controller configured to output a vehicle control signal at least partially on the basis of processing of the first sensor and the second sensor, wherein the controller is configured to generate a primary vehicle control signal for avoiding a primary collision when a primary collision with the first objects is predicted according to a first direction sensing result by the at least one first sensor, to modify the primary vehicle control signal into a secondary vehicle control signal on the basis of a result of sensing the second objects by the at least one second sensor, and to output the secondary vehicle control signal.

In accordance with another aspect of the present disclosure, there is provided a vehicle collision avoidance control system including: at least one first sensor configured to sense a first direction of a driver vehicle and to sense objects in the first direction of the driver vehicle; at least one second sensor configured to sense a second direction that is opposite to the first direction of the driver vehicle and to sense objects in the second direction of the driver vehicle; an emergency braking control module configured to perform a collision avoidance operation when a possibility that the driver vehicle will collide with a different vehicle is sensed; and a domain control unit configured to process sensing results by the first sensor and the second sensor and configured to control at least one driver assist system module provided in the driver vehicle, including the emergency braking control module configured to perform a collision avoidance operation when a possibility that the driver vehicle will collide with a different vehicle is sensed, wherein the domain control unit is configured to control the at least one driver assist system module so as to generate a primary vehicle control signal for avoiding a primary collision when a primary collision with the first objects is predicted according to a first direction sensing result by the at least one first sensor, to modify the primary vehicle control signal into a secondary vehicle control signal on the basis of a result of sensing the second objects by the at least one second sensor, and to output the secondary vehicle control signal.

In accordance with another aspect of the present disclosure, there is provided a vehicle collision avoidance control device including: at least one first sensor configured to sense a first direction of a driver vehicle and to sense objects in the first direction of the driver vehicle; at least one second sensor configured to sense a second direction that is opposite to the first direction of the driver vehicle and to sense objects in the second direction of the driver vehicle; and a controller configured to generate a primary vehicle control signal for avoiding a primary collision when a primary collision with the first objects is predicted according to a first direction sensing result by the at least one first sensor, to modify the primary vehicle control signal into a secondary vehicle control signal on the basis of a result of sensing the second objects by the at least one second sensor, and to output the secondary vehicle control signal.

In accordance with another aspect of the present disclosure, there is provided a domain control unit including: an input module configured to receive an input of a first direction sensing result obtained by sensing objects in a first direction of a driver vehicle and to receive an input of a second direction sensing result obtained by sensing objects in a second direction that is opposite to the first direction of the driver vehicle; a control module configured to determine a possibility that a primary collision with the first objects will occur according to the first direction sensing result, to determine a possibility that a secondary collision with the second objects will occur on the basis of the second direction sensing result when it is determined that there is a possibility that the primary collision will occur, and to modify a vehicle control signal generated according to the first direction sensing result when it is determined that there is a possibility that the second collision will occur; and an output module configured to output the modified vehicle control signal.

In accordance with another aspect of the present disclosure, there is provided a vehicle collision avoidance control method including: sensing a first direction of a driver vehicle by at least one first sensor and sensing objects in the first direction of the driver vehicle; generating a primary vehicle control signal for avoiding a primary collision by a controller when a primary collision with the first objects is predicted according to a first direction sensing result by the at least one first sensor; sensing a second direction that is opposite to the first direction of the driver vehicle by at least one second sensor and sensing objects in the second direction of the driver vehicle; and modifying the primary vehicle control signal into a secondary vehicle control signal by the controller on the basis of a second direction sensing result by the at least one second sensor and outputting the secondary vehicle control signal.

In accordance with another aspect of the present disclosure, there is provided a camera module including: an image sensor arranged on a vehicle so as to have a field of view regarding a first direction of the vehicle and a second direction that is opposite to the first direction and configured to capture image data; and a processor configured to process the image data captured by the image sensor, wherein the image data is used to sense objects in the first direction and to sense objects in the second direction, and the image data is used to generate a primary vehicle control signal for avoiding a primary collision when a primary collision between the vehicle and the first objects is predicted according to a first direction sensing result, to modify the primary vehicle control signal into a secondary vehicle control signal on the basis of a result of sensing the second objects, and to output the secondary vehicle control signal.

As described above, according to the present disclosure, it is possible to provide a vehicle collision avoidance device and a method for controlling the same, wherein vehicle collision risks both in the traveling direction and in the opposite direction of the traveling direction can be prevented, thereby securing traveling safety.

In addition, according to the present disclosure, it is possible to provide a vehicle collision avoidance device and a method for controlling the same, wherein, by preventing a series of rear-end collisions, smooth traffic flow or vehicle traveling is guaranteed, thereby reducing fuel consumption and the amount of exhaust gas.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
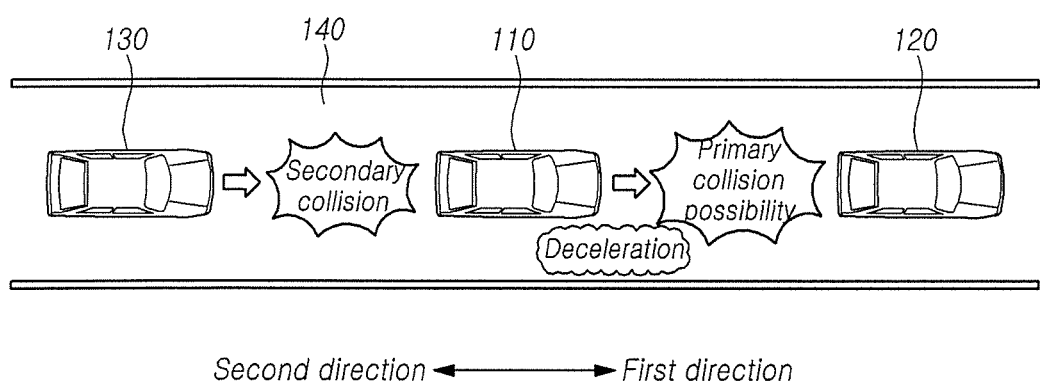
FIG. 1 schematically illustrates a situation in which a driver vehicle may collide with a first target vehicle and a second target vehicle.

Hereinafter, some embodiments of the present disclosure will be described in detail with reference to the accompanying exemplary drawings. In connection with describing elements of the present disclosure, terms such as first, second, A, B, (a), and (b) may be used. Such a term is solely for the purpose of distinguishing an element from another element, and does not limit the nature, sequence, or order of the corresponding element. It is to be understood that, when an element is described as being "connected", "coupled", or "joined" to another element, the element may be directly connected or joined to the other element, but another element may also be "connected", "coupled", or "joined" between respective elements.

In this specification, "road lines" may refer to lines marked on a road at a predetermined interval along the traveling direction, or may refer to spaces along which vehicles travel (that is, lanes). It will be assumed in the following, for convenience of description, that "road lines" refer to lanes. The term "lane sensing" refers to sensing a vehicle traveling in the corresponding lane, an obstacle or a pedestrian existing in the corresponding lane, or the like. It must be noted that while the term "traveling lane" (or a variation thereof) is used throughout the specification, the embodiments described herein are not restricted to vehicle traveling alone "lanes" marked with, for example, lane markers, the description generally is not limited marked lanes and is applicable equally to travel paths where specific lane markers are not formed on the road.

In this specification, the first direction may correspond to the vehicle traveling direction, and the second direction may correspond to the opposite direction of the vehicle traveling direction. According to the situation, a vehicle may travel forward or backward. For example, when a vehicle moves forward, the first direction may indicate the forward direction of the vehicle, and the second direction may indicate the backward direction thereof. On the contrary, when a vehicle moves backward, the first direction may indicate the backward direction of the vehicle, and the second direction may indicate the forward direction thereof. In addition, the first direction and the second direction may refer to directions along straight lines. Moreover, when a vehicle turns forward or backward and then travels (moves), the first direction and the second direction may correspond to the vehicle turning direction and the opposite direction thereof, respectively.

A vehicle may be used in this specification as a concept including an automobile, a motorcycle, and the like. In addition, a vehicle may be used as a concept encompassing an internal combustion engine vehicle having an engine as a power source, a hybrid vehicle having an engine and an electric vehicle as power sources, an electric vehicle having an electric motor as a power source, and the like. Automobiles will be regarded as exemplary vehicles in the following description.

It is to be understood that in general, when vehicles travel on a road (paved or unpaved), there is possibility of collision with numerous objects such as, for example, stray animals, objects dropping from other vehicles, etc. However, in general, the probability of collision with another vehicle is greater than with other objects. Thus, in describing the various embodiments of the present disclosure, the term vehicle is used when referring to objects with which the driver vehicle may possibly collide. The embodiments are, however, not limited to collisions with vehicles, and are equally applicable for collisions with other objects encountered by vehicles on a road.

FIG. 1 schematically illustrates a situation in which a driver vehicle 110 may collide with a first target vehicle 120 and a second target vehicle 130.

Referring to FIG. 1, the driver vehicle 110, the first target vehicle 120, and the second target vehicle 130 are traveling in the traveling lane 140 of the driver vehicle 110. The driver vehicle 110 may sense the periphery of the driver vehicle 110 through sensors mounted inside the driver vehicle 110. The sensing object may include a peripheral traveling lane 140, the first target vehicle 120, or the second target vehicle 130.

It will be assumed that the first target vehicle 120, the driver vehicle 110, and the second target vehicle 130 are traveling in the first direction, for example, in the forward direction of the vehicles: if the first target vehicle 120 suddenly stops due to a malfunction or another abnormal condition, the driver vehicle 110 senses the stopped first target vehicle 120 through a sensor, such as a radar or a camera, installed on the front part thereof. A safety function system, such as an AEBS (Autonomous Emergency Braking System), mounted inside the driver vehicle 110 operates and conducts a control such that the driver vehicle 110 is braked to avoid collision with the first target vehicle 120. During operation, the AEBS senses only a target object in the traveling direction and brakes the driver vehicle 110. In addition, when the driver vehicle 110 is braked and stopped by the operation of the AEBS, the AEBS operation is released. In this case, the driver vehicle 110 may undergo a secondary collision with a second target vehicle 130 that approaches the driver vehicle 110 in the opposite direction of the traveling direction of the driver vehicle 110.

Figure 2A:
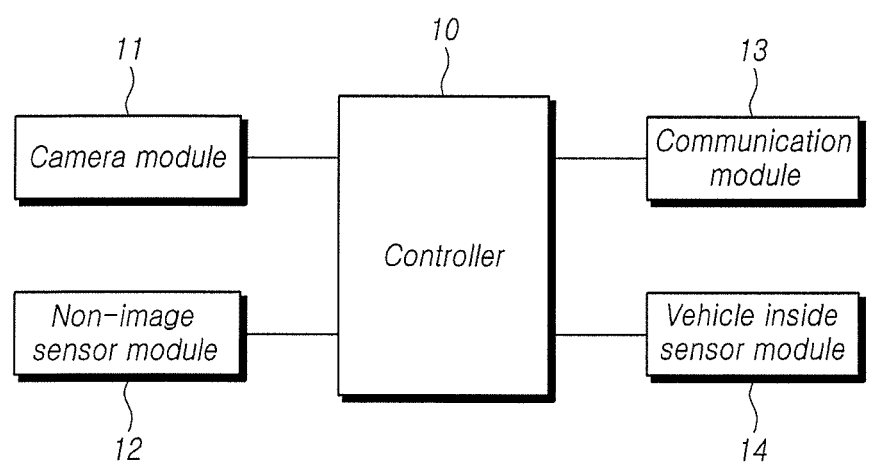
FIG. 2A schematically illustrates a block diagram of a vehicle to which the present disclosure is applied.

FIG. 2A schematically illustrates a block diagram of a vehicle to which the present disclosure is applied.

Referring to FIG. 2A, the vehicle may include a controller 10, a camera module 11, a non-image sensor module 12, a communication module 13, and a vehicle inside sensor module 14.

For example, the camera module 11 may include an image sensor configured to have a field of view regarding the inside or outside of the vehicle and to capture image data and a processor configured to process the captured image data.

As an example, the image sensor may be arranged on the vehicle so as to have a field of view regarding the inside or outside of the vehicle. At least one image sensor may be mounted on each part of the vehicle so as to have a field of view regarding the front portion, side portion, or rear portion of the vehicle.

Image information taken by the image sensor includes image data and thus may refer to image data captured by the image sensor. In the present disclosure, image information taken by the image sensor will hereinafter be referred to as image data captured by the image sensor. Image data captured by the image sensor may be generated in a format selected from raw-type AVI, MPEG-4, H.264, DivX, and JPEG, for example.

The image data captured by the image sensor may be processed by the processor. The processor may operate to process the image data captured by the image sensor.

The processor may be implemented, in terms of hardware, by using at least one electric unit capable of processing image data and performing other functions, such as ASICs (application specific integrated circuits), DSPs (digital signal processors), DSPDs (digital signal processing devices), PLDs (programmable logic devices), FPGAs (field programmable gate arrays), controllers, micro-controllers, and microprocessors.

Meanwhile, the non-image sensor module 12 refers to a sensor module other than the camera module 11 that captures images. For example, multiple non-image sensor modules 12 may be arranged on the vehicle so as to have a sensing area regarding the inside or outside of the vehicle, and may capture sensing data. Examples of the multiple non-image sensor modules 12 include a RADAR sensor, a LIDAR sensor, an ultrasonic sensor, and the like. The non-image sensor module 12 may be omitted, or at least one thereof may be provided.

The communication module 13 performs functions for performing vehicle-to-vehicle communication, vehicle-to-infrastructure communication, vehicle-to-server communication, inter-vehicle communication, and the like. To this end, the communication module 13 may include a transmitting module and a receiving module. For example, the communication module 13 may include a broadcast receiving module, a wireless Internet module, a short-range communication module, a position information module, an optical communication module, and a V2X communication module.

The broadcast receiving module receives broadcasting signals or broadcasting-related information from an external broadcasting management server through a broadcasting channel. The broadcasting in this regard includes at least one selected from radio broadcasting and TV broadcasting. The wireless Internet module refers to a module for wireless Internet connection, and may be provided on the vehicle internally or externally. The short-range communication module is for the purpose of short-range communication and may support support-range communication by using at least one technology selected from Bluetooth™, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct, and Wireless USB (Wireless Universal Serial Bus).

The position information module is a module for acquiring position information of the vehicle, and a typical example thereof is a GPS (Global Positioning System) module. For example, when the GPS module is employed by the vehicle, the position of the vehicle may be acquired by using signals sent from GPS satellites. According to the embodiment, the position information module may be an element included in the vehicle inside sensor module 14, not an element included in the communication module 13.

The optical communication module may include an optical transmitter and an optical receiver. The optical transmitter and the optical receiver may convert light signals into electrical signals, thereby transmitting/receiving information.

The V2X communication module is a module for performing wireless communication with a server, another vehicle, or an infrastructure device. In the present embodiment, the V2X communication module refers to exchange of information performed by a vehicle with an object such as another vehicle, a mobile device, or a road through a wired/wireless network, or a technology therefor. The V2X communication module may include the following concepts: V2V (Vehicle to Vehicle) communication, V2I (Vehicle to Infrastructure) communication, V2N (Vehicle to Nomadic Device) communication, and V2P (Vehicle to Pedestrian) communication. The V2X communication module is based on DSRC (Dedicated Short-Range Communications), and may use WAVE (Wireless Access in Vehicular Environment) recently enunciated by American IEEE, or IEEE 802.11p communication technology that employs 5.9 GHZ bands. However, the V2X communication module is not limited thereto, and is to be understood as including all V2V communication developed currently or to be developed in the future.

The vehicle inside sensor module 14 refers to a sensor for sensing vehicle inside information. For example, the vehicle inside sensor module 14 may refer to a torque sensor for sensing the steering torque, a steering angle sensor for sensing the steering angle, a motor position sensor for sensing information regarding the steering motor, a vehicle velocity sensor, a vehicle motion sensing sensor for sensing the motion of the vehicle, or a vehicle posture detection sensor. Besides, the vehicle inside sensor module 14 may refer to a sensor for sensing various types of data regarding the inside the vehicle, and one or more thereof may be configured.

The controller 10 may acquire data from at least one module selected from the camera module 11, the non-image sensor module 12, the communication module 13, and the vehicle inside sensor module 14 and may control various operations of the vehicle on the basis of the acquired data. Alternatively, the controller 10 may acquire image data from the camera module 11 and may process the image data. In addition, the controller 10 may receive sensing data from the non-image sensor module 12 and may process the same. Alternatively, the controller 10 may acquire data from the vehicle inside sensor module 14 or the communication module 13 and may process the same. For the purpose of such processing, the controller 10 may include at least one processor.

Besides, the controller 10 may control the operation of at least one module selected from the camera module 11, the non-image sensor module 12, the communication module 13, and the vehicle inside sensor module 14. In addition, the controller 10 may control the operation of various driver assist systems configured in the vehicle.

Figure 2B:
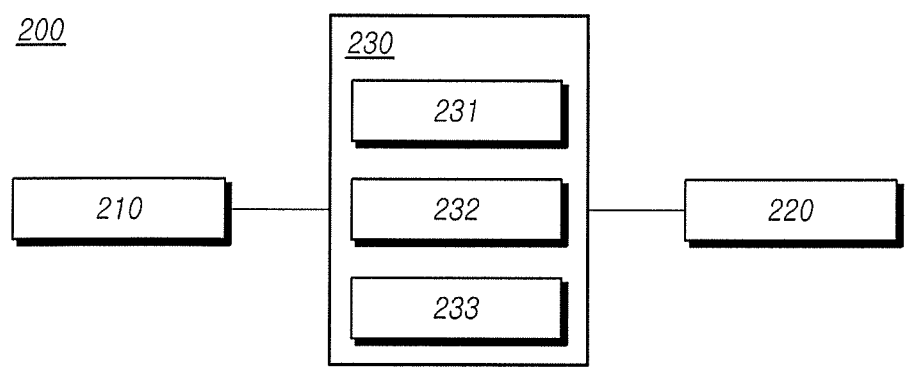
FIG. 2B schematically illustrates the configuration of a vehicle collision avoidance control device according to the present disclosure.
Figure 3:
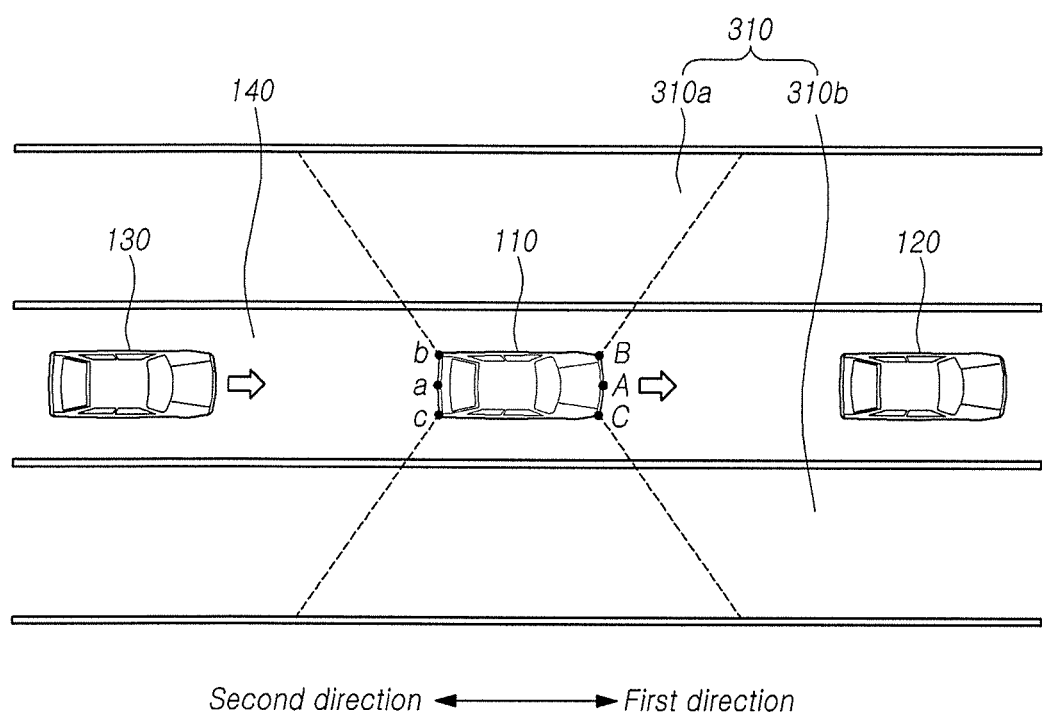
FIG. 3 illustrates a first sensor and a second sensor included in a vehicle collision avoidance control device according to the present disclosure.

FIG. 2B schematically illustrates the configuration of a vehicle collision avoidance control device 200 according to the present disclosure. FIG. 3 illustrates a first sensor 210 and a second sensor 210 included in the vehicle collision avoidance control device 200 according to the present disclosure.

Referring to FIG. 2B, the vehicle collision avoidance control device 200 according to the present disclosure includes: at least one first sensor 210 that senses a first direction of the driver vehicle 110 and senses a first target vehicle 120 in the first direction of the driver vehicle 110; at least one second sensor 220 that senses a second direction, which is opposite to the first direction of the driver vehicle 110, and senses a second target vehicle 130 in the second direction of the driver vehicle 110; and a controller 230 that outputs a vehicle control signal at least partially on the basis of processing of the first sensor 210 and the second sensor 220. When a primary collision with the first target vehicle 120 is predicted according to the first direction sensing result by the at least one sensor 210, the controller 230 may generate a primary vehicle control signal for avoiding the primary collision, may modify the primary vehicle control signal into a secondary vehicle control signal on the basis of the result of sensing the second target vehicle 130 by the at least one second sensor 220, and may output the secondary vehicle control signal.

At least one first sensor 210 may be installed on a specific part of the driver vehicle 110 in order to sense the first direction of the driver vehicle 110. For example, as illustrated in FIG. 3, three first sensors A, B, and C may be installed on the periphery of the radiator grill or the headlights of the driver vehicle 110. The position in which the first sensors 210 are installed on the vehicle or the number thereof is not limited to those illustrated in FIG. 3.

At least one sensor selected from the first sensor 210 and the second sensor 220 may be a camera module 11 which is arranged on the driver vehicle so as to have a field of view regarding the outside of the driver vehicle, and which is configured to capture image data and to process the captured image data. Alternatively, at least one sensor selected from the first sensor 210 and the second sensor 220 may be a non-image sensor module 12 which is arranged on the driver vehicle so as to have a sensing area regarding the outside of the driver vehicle, and which is configured to capture sensing data and to process the captured sensing data.

For example, the first sensor 210 may be a camera, a radar, a lidar, an ultrasonic sensor, an infrared camera, or a combination thereof, but is not limited thereto. At least one first sensor 210 may sense the first direction of the driver vehicle 110 at a predetermined angle and may sense a first peripheral vehicle traveling in one or more adjacent lane 310a and 310b that are adjacent to the traveling lane 140 of the driver vehicle 110. Referring to FIG. 3, for example, a camera and a radar sensor installed on the radiator grill of the driver vehicle 110 may sense the traveling lane 140 of the driver vehicle 110, a first adjacent lane 310a of the traveling lane 140 of the driver vehicle 110, and a second adjacent lane 310b of the traveling lane 140 of the driver vehicle 110, and may sense a first target vehicle 120 traveling in the traveling lane 140 of the driver vehicle 110 in front of the driver vehicle 110.

The second sensor 220 may be installed on a specific part of the driver vehicle 110 in order to sense the second direction of the driver vehicle 110. For example, as illustrated in FIG. 3, three second sensors a, b, and c may be installed on the periphery of the trunk or tail lamps of the driver vehicle 110. The position in which the second sensors 220 are installed on the vehicle or the number thereof is not limited to those illustrated in FIG. 3.

The second sensor 220 may be, as in the case of the first sensor, a camera, a radar, a lidar, an ultrasonic sensor, an infrared camera, or a combination thereof, but is not limited thereto. At least one second sensor 220 may sense the second direction of the driver vehicle 110 at a predetermined angle and may sense a second peripheral vehicle traveling in one or more adjacent lane 310b and 310b that are adjacent to the traveling lane 140 of the driver vehicle 110. Referring to FIG. 3, for example, a radar sensor installed on a tail lamp of the driver vehicle 110 may sense the traveling lane of the driver vehicle 110, a first adjacent lane 310a of the traveling lane 140 of the driver vehicle 110, and a second adjacent lane 310b of the traveling lane 140 of the driver vehicle 110, and may sense a second target vehicle 130 traveling in the traveling lane 140 of the driver vehicle 110 behind the driver vehicle 110.

The controller 230 is a device for assisting traveling when the driver drives the driver vehicle 110. For example, the controller 230 may drive an ADAS (Advanced Driver Assistance System), an AEBS (Autonomous Emergency Braking System), an ACC (Adaptive Cruise Control), or an avoidance steering system, but is not limited thereto. In order to drive the above-mentioned systems, the controller 230 may correspond to an ECU (Electronic Control Unit). It will be assumed in this specification, for convenience of description, that the controller 230 is a single device, but may also refer to a group of individual controllers 230 having respective functions, such as the above-mentioned AEB. Alternatively, the controller 230 may refer to a domain control unit that controls at least one driver assist system.

The controller 230 may include an input module 231 which receives an input of a first direction sensing result obtained by sensing a first target vehicle in the first direction of the driver vehicle, and which receives an input of a second direction sensing result obtained by sensing a second target vehicle in the second direction that is opposite to the first direction of the driver vehicle; a control module 232 which determines a possibility that a primary collision with the first target vehicle will occur according to the first direction sensing result, which determines a possibility that a secondary collision with the second target vehicle will occur on the basis of the second direction sensing result when it is determined that there is a possibility that the primary collision will occur, and which modifies the generated vehicle control signal according to the first direction sensing result when it is determined that there is a possibility that the second collision will occur; and an output module 233 that outputs the modified vehicle control signal.

The vehicle control signal may be a signal for controlling the behavior of the driver vehicle 110. For example, the same may correspond to a braking device, a steering device, hazard lamps, an alarm sound (siren), or a warning notification, but is not limited thereto.

The operation of the vehicle collision avoidance control device 200 according to the present disclosure will now be described with reference to FIG. 4.

Figure 4:
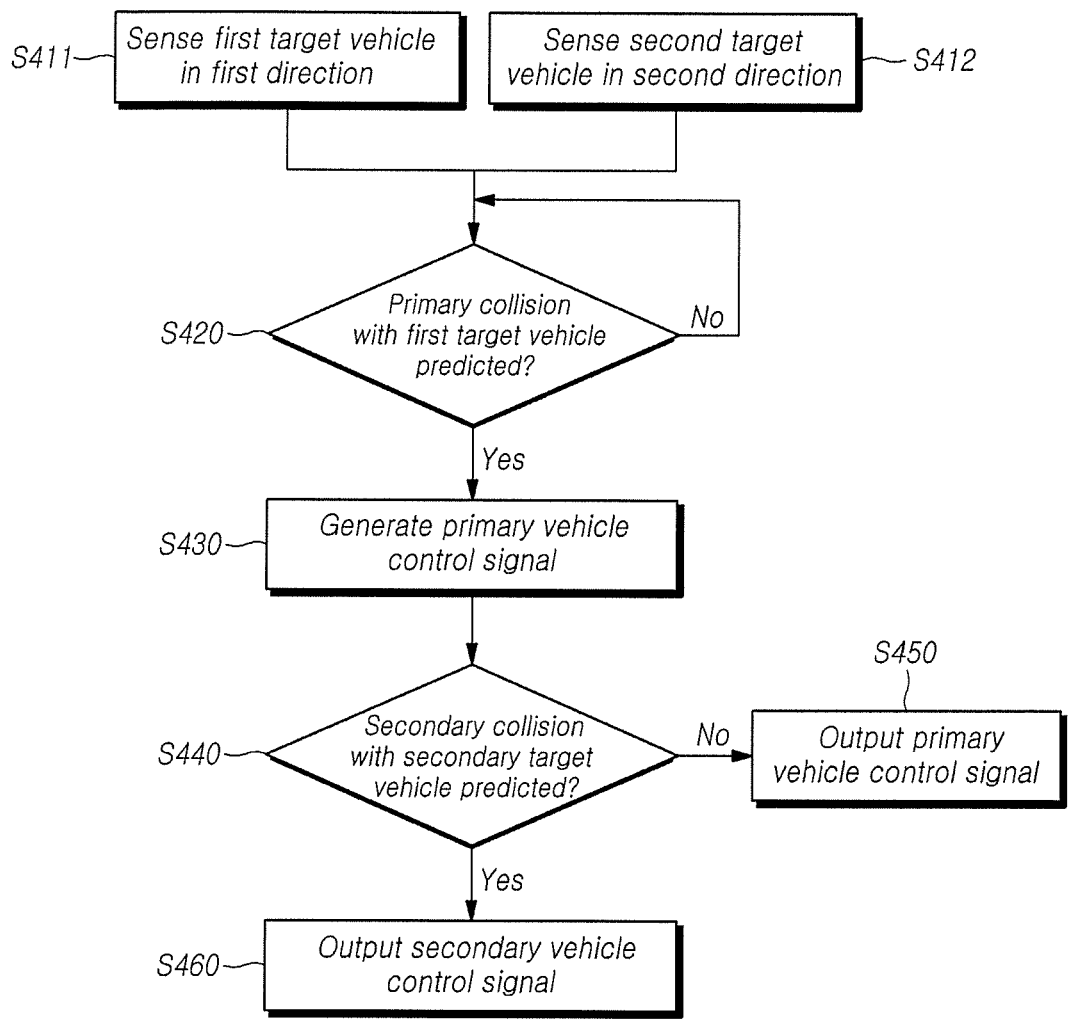
FIG. 4 is a flowchart regarding the operation of a vehicle collision avoidance control device according to the present disclosure.

FIG. 4 is a flowchart regarding the operation of the vehicle collision avoidance control device 200 according to the present disclosure.

Referring to FIG. 4, the vehicle collision avoidance control device 200 according to the present disclosure may sense (S411) a first target vehicle 120 in the first direction of the driver vehicle 110 and may sense (S412) a second target vehicle 130 in the second direction at the same time or with a time difference. With regard to the first target vehicle 120 or the second target vehicle 130, the relative velocity of the target vehicle, the distance between the driver vehicle 110 and the target vehicle, or the relative position between the same may be calculated. It is then determined (S420) whether a collision with the first target vehicle 120 will occur or not (e.g., by determining a probability of a primary collision with a first object based on sensing data from a first sensor, and determining whether the determined probability of the primary collision is greater than a first threshold). When there is a possibility that the driver vehicle 110 will undergo a primary collision with the first target vehicle 120 because the first target vehicle 120 has cut in the traveling lane 140 of the driver vehicle 110, has abruptly decreased the vehicle velocity, or has stopped, a primary vehicle behavior control signal is first generated (S430) (e.g., by generating, if the determined probability of the primary collision is greater than a first threshold, a primary control signal for reducing a speed of the driver vehicle to avoid a primary collision).

The primary vehicle behavior control signal may be a control signal generated preliminarily before the result of sensing the second target vehicle 130 is reflected. The primary vehicle control signal is a signal for preventing a primary collision with the first target vehicle, and may include a velocity control signal for reducing the velocity of the driver vehicle or braking the driver vehicle.

After the vehicle collision avoidance control device 200 generates the primary vehicle behavior control signal, it is determined (S440) whether the primary vehicle control signal is to be modified or not according to the result of sensing the second target vehicle 130. The result of sensing the second target vehicle 130 may be obtained by considering the relative velocity of the second target vehicle 130 or the relative distance or position between the second target vehicle 130 and the driver vehicle 110. Therefore, when there is no possibility of a secondary collision with the second target vehicle 130 because the second target vehicle 130 is not sensed or is sensed at a comparatively remote location from the driver vehicle 110, the generated primary vehicle behavior control signal is output (S450) so as to control the driver vehicle 110. For example, the driver vehicle 110 may be braked by a velocity control signal. When there is a possibility of a secondary collision with the second target vehicle 130, the generated primary vehicle control signal is modified into a secondary vehicle control signal, which is then output (S460) (e.g., by modifying, in response to a detection of a second object in the second direction based on sensing data from the second sensor and a probability of a second collision with the second object if the driver vehicle is controlled according to the primary control signal is greater than a second threshold, the primary control signal into a secondary control).

The secondary vehicle control signal may include a lane change control signal form changing the traveling lane of the driver vehicle. The secondary vehicle control signal may be a lane change control signal for changing the traveling lane 140 of the driver vehicle 110, a control signal for turning on the hazard lights of the driver vehicle 110, a warning control signal for notifying the driver, or a control signal for activating the airbag in advance prior to a collision, but is not limited thereto.

The secondary vehicle control signal may further include a velocity control signal. That is, the secondary vehicle control signal may be a vehicle control signal further including a primary vehicle control signal. For example, the secondary vehicle control signal may include a control signal for reducing the velocity of the driver vehicle 110 and a lane change control signal for changing the traveling lane 140 of the driver vehicle 110.

Figure 5:
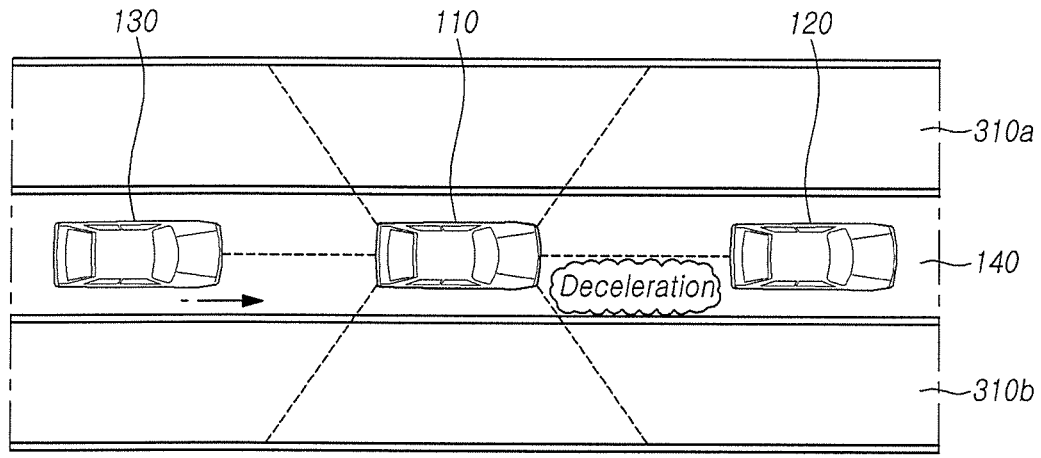
FIG. 5 illustrates an exemplary situation in which a driver vehicle is avoidance-controlled with regard to a first target vehicle and a second target vehicle.
Figure 5:
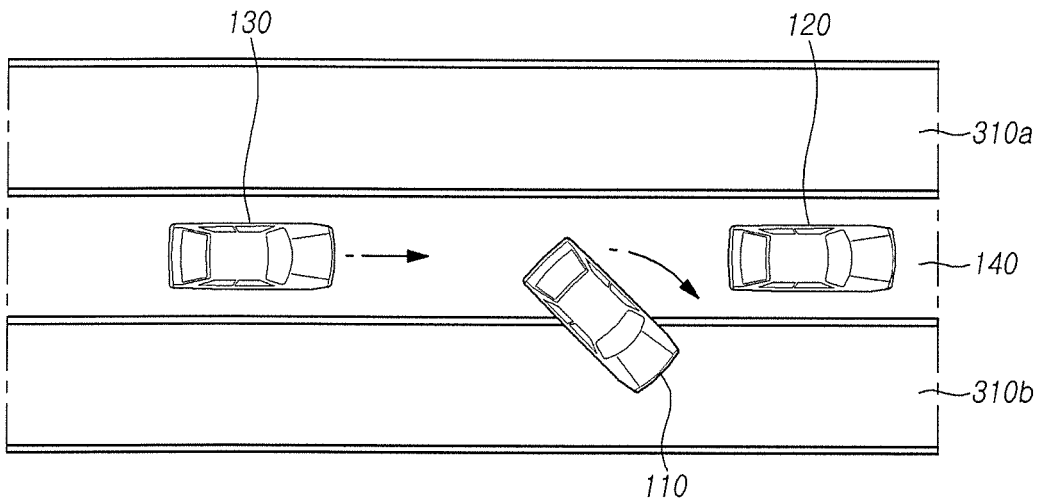

FIG. 5 illustrates an exemplary situation in which the driver vehicle 110 is avoidance-controlled with regard to the first target vehicle 120 and the second target vehicle 130.

Referring to FIG. 5, if the first target vehicle 120 stops due to a malfunction or the like, at least one first sensor 210, for example, a camera and a radar, installed on the front part of the driver vehicle 110 senses the first target vehicle 120.

The controller 230 determines a possibility of a primary collision with the first target vehicle 120 in view of the distance between the first target vehicle 120 and the driver vehicle 110, which has been sensed by the first sensor 210, or the velocity of the driver vehicle 110. When the controller 230 determines that there is a possibility that a primary collision with the first target 120 will occur, a primary vehicle control signal, for example, an AEBS control signal for braking the driver vehicle 110, is generated.

At least one second sensor 220, for example, a camera and a radar, installed on the rear part of the driver vehicle 110 senses the second target vehicle 130 that approaches the driver vehicle 110. In this case, if the driver vehicle 110 is braked by the primary vehicle control signal, for example the AEBS control signal, there is a possibility that the driver vehicle 110 will undergo a secondary collision with the second target vehicle 130.

Therefore, the controller 230 may brake the driver vehicle 110 in order to avoid a secondary collision with the second target vehicle 130, may control the steering so as to change the traveling lane by making a right turn, and may conduct a control such that a warning sound is generated to notify the driver of the risk situation, or the display device displays a warning, but is not limited thereto.

Figure 6:
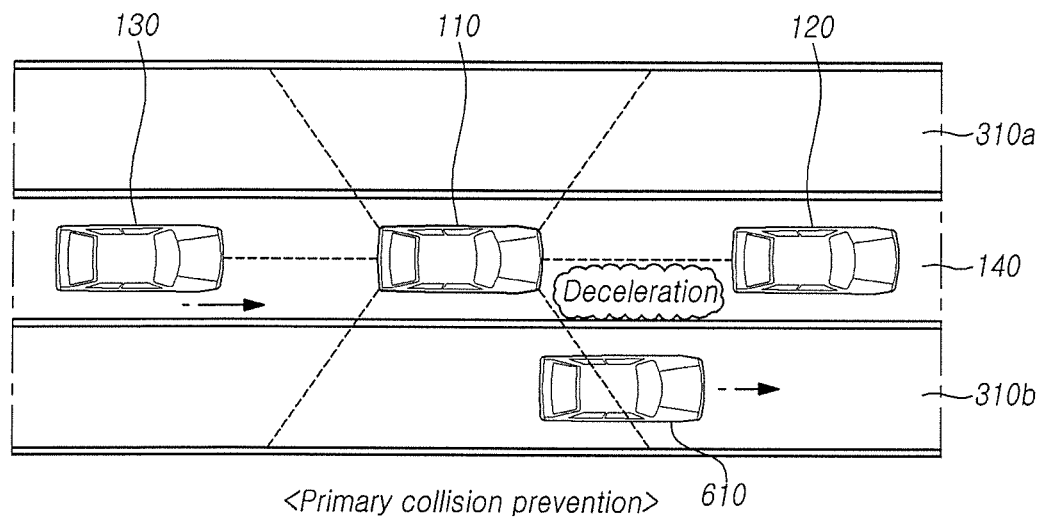
FIG. 6 illustrates an exemplary situation in which a driver vehicle is avoidance-controlled when a first peripheral vehicle exists.
Figure 6:
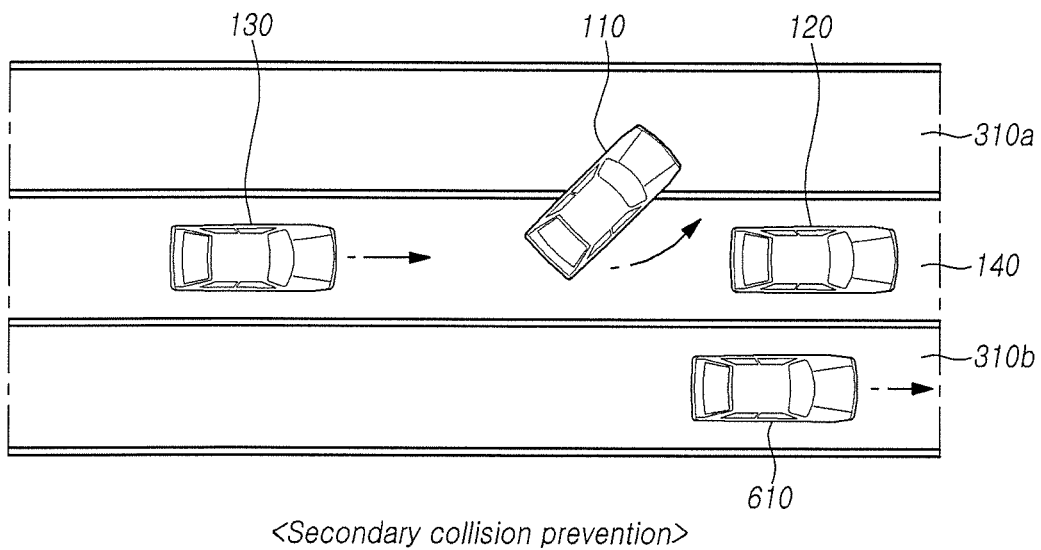

FIG. 6 illustrates an exemplary situation in which the driver vehicle 130 is avoidance-controlled when a first peripheral vehicle 120 exists.

Referring to FIG. 3 and FIG. 6, as described above, at least one first sensor 210 included in the vehicle collision avoidance control device 200 mounted on the driver vehicle 110 may sense the first direction of the driver vehicle 110 at a predetermined angle and may sense a first peripheral vehicle 610 traveling in at least one adjacent lane 310 that is adjacent to the traveling lane 140 of the driver vehicle 110.

Although there may be a single first peripheral vehicle 610 as illustrated in FIG. 6, the same may refer to two or more vehicles which are different from the first target vehicle 120, and which are sensed in the adjacent lane 310 in the first direction.

The vehicle collision avoidance control device 200 included in the driver vehicle 110 may control the driver vehicle 110 in the method as described with reference to FIG. 5 with regard to the first target vehicle 120 and the second target vehicle 130.

When the first peripheral vehicle 610 exists, the controller 230 may generate a primary vehicle control signal for avoiding a primary collision. If a secondary collision is predicted as a result of sensing the second target vehicle 130 by at least one second sensor 220, the controller 230 may search for a peripheral lane to which the driver vehicle can move. Then, the controller 230 may remodify and output a secondary vehicle control signal including a lane change control signal that instructs the driver vehicle to make an avoidance movement to the discovered peripheral lane. The peripheral lane in this regard may have the same meaning as the adjacent lane 310 that is adjacent to the traveling lane 140 of the driver vehicle 110.

For example, the controller 230 generates an AEB control signal for braking the driver vehicle 110 in order to avoid a primary collision with the first target vehicle 120 that has stopped. When a second target vehicle 120 approaches behind the driver vehicle 110, and when a secondary collision between the driver vehicle 110 and the secondary target vehicle is predicted, the controller 230 searches for a lane to which the driver vehicle 110 can move, among the adjacent lanes 310a and 310b that are adjacent to the traveling lane 140 of the driver vehicle 110. In the first direction, no vehicle is sensed in the first adjacent lane 310a, and a first peripheral vehicle 610 is sensed in the second adjacent lane 310b. Accordingly, the controller 230 may output a secondary vehicle control signal including a lane change control signal that instructs the driver vehicle 110 to make a left turn and move to the first adjacent lane 310a.

As another example, the controller 230 may remodify and output the secondary vehicle control signal according to the result of sensing the first peripheral vehicle.

For example, when the first sensor 210 senses a first target vehicle 120 that has stopped, and when the controller 230 determines that there is a possibility of a primary collision with the first target vehicle 120, an AEB control signal is generated. When the controller 230 determines that there is a possibility of a secondary collision according to the result of sensing the second target vehicle 130, the controller 230 modifies the secondary vehicle control signal including a signal that controls the driver vehicle so as to change lanes by moving to the second adjacent lane 320b. However, since there exists a first peripheral vehicle 610 traveling in the second adjacent lane 320b, a movement of the driver vehicle 110 to the second adjacent lane 320b may cause a collision with the first peripheral vehicle 610. Accordingly, the controller 230 may remodify the second vehicle control signal so as to include a signal that controls the driver vehicle 110 so as to change lanes by moving to the first adjacent lane 320a.

The primary vehicle control signal may include a velocity control signal for reducing the velocity of the driver vehicle 110 or braking the driver vehicle 110, and the remodified secondary vehicle control signal may include a lane change control signal for moving the driver vehicle 110 from the traveling lane 140 to the peripheral lane 310a that is different from the peripheral lane 310b in which the first peripheral vehicle 610 travels. The secondary vehicle control signal may further include a velocity control signal.

As described above, the peripheral lane may have the same meaning as the adjacent lane 310 that is adjacent to the traveling lane 140 of the driver vehicle 110.

Figure 7:
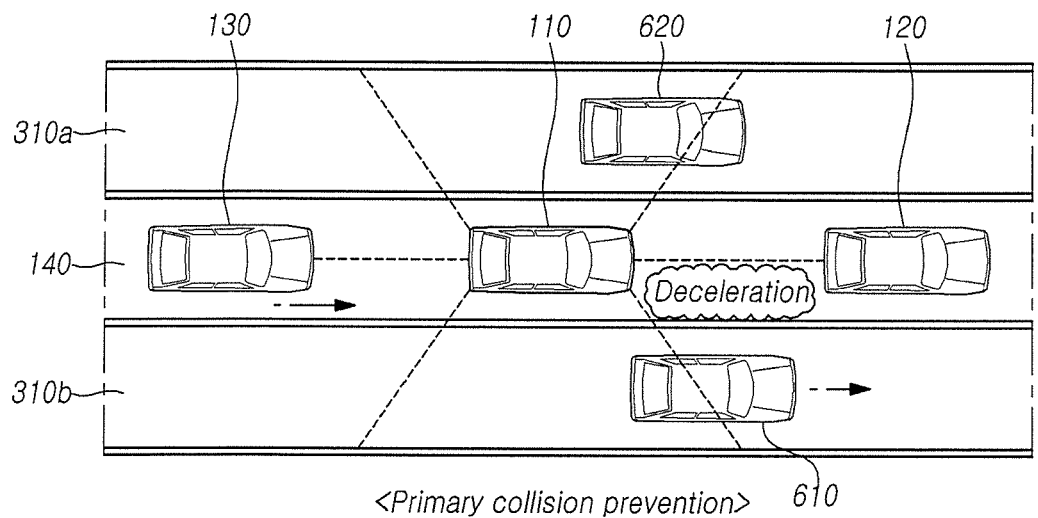
FIG. 7 illustrates an exemplary situation in which a driver vehicle moves from the traveling lane to the lane of the first peripheral vehicle.
Figure 7:
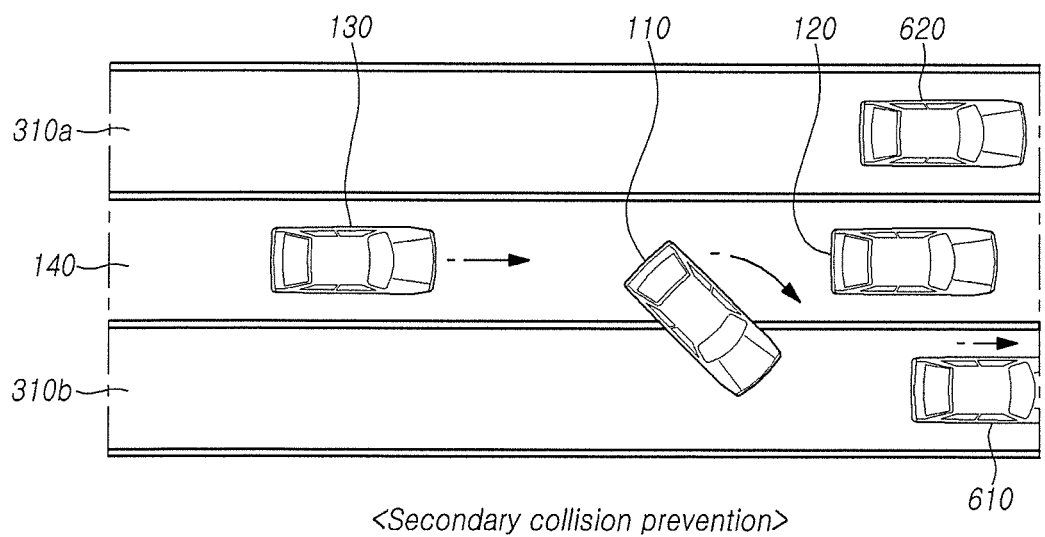

FIG. 7 illustrates an exemplary situation in which the driver vehicle 110 moves from the traveling lane to the lane of the first peripheral vehicle 610.

Referring to FIG. 7, when first peripheral vehicles 610 and 620 exist in both adjacent lanes 310 that are adjacent to the traveling lane 140 of the driver vehicle 110, the driver vehicle 110 may have to change lanes by moving to the first adjacent lane 310a or to the second adjacent lane 310b, according to the situation.

The first peripheral vehicles 610 and 620 may refer to all of the two or more vehicles as described above with reference to FIG. 6. In order to distinguish the first peripheral vehicles 610 and 620, it will be assumed in the following description that the first peripheral vehicle traveling in the first adjacent lane 310a is referred to as a first peripheral vehicle A 620, and the first peripheral vehicle traveling in the second adjacent lane 310 is referred to as a first peripheral vehicle B 610.

In this case, the controller 230 may generate a primary vehicle control signal for avoiding a primary collision as described above. If a secondary collision is predicted as a result of sensing the second target vehicle 130 by at least one second sensor 220, the controller 230 may search for a peripheral lane to which the driver vehicle can move. Then, the controller 230 may remodify and output a secondary vehicle control signal including a lane change control signal that instructs the driver vehicle 110 to make an avoidance movement to the discovered peripheral lane.

It will be assumed, for example, that the relative velocity of the first peripheral vehicle B 610 is higher than the relative velocity of the first peripheral vehicle A 620. The controller 230 then generates an AEB control signal for braking the driver vehicle 110 in order to avoid a primary collision with the first target vehicle 120 that has stopped. When a secondary collision between the driver vehicle 110 and the secondary target vehicle 130 is predicted, the controller 230 searches for a lane to which the driver vehicle 110 can move, among the adjacent lanes 310a and 310b that are adjacent to the traveling lane 140 of the driver vehicle 110. In the first direction, the first peripheral vehicle A 620 traveling in the first adjacent lane 310a and the first peripheral vehicle B 610 traveling in the second adjacent lane 310b are both sensed. In this case, the relative velocity of the first peripheral vehicle A 620 and the relative velocity of the first peripheral vehicle B 610 may be measured and compared by the first sensor 210 and the controller 230. The second adjacent lane 310b corresponding to the first peripheral vehicle B 610 having a higher relative velocity may be found as the peripheral lane to which the driver vehicle can move. A secondary vehicle control signal then may be remodified and output, which includes a lane change control signal that instructs the driver vehicle to make a right turn and make an avoidance movement to the second adjacent lane 310b.

In the above-mentioned example, it is possible to search for the lane to which the driver vehicle can move by using the relative distance or position between the driver vehicle 110 and the first peripheral vehicle A 620 or the relative distance or position between the driver vehicle 110 and the first peripheral vehicle B 610, instead of the relative velocity of the first peripheral vehicle A 620 and the relative velocity of the first peripheral vehicle B 610. That is, a radar sensor may be used to measure the relative distance or position between the driver vehicle 110 and the first peripheral vehicles 610 and 620 from signals received after being reflected from the first peripheral vehicles 610 and 620. With reference to FIG. 7 and the relative positions, the second adjacent lane 310b corresponding to the first peripheral vehicle B 610, which is positioned comparatively farther than the driver vehicle 110, is found as the lane to which the driver vehicle can move.

The primary vehicle control signal may include a velocity control signal for reducing the velocity of the driver vehicle 110 or braking the driver vehicle 110, and the remodified secondary vehicle control signal may include a lane change control signal for moving the driver vehicle 110 from the traveling lane 140 to the peripheral lane in which a first peripheral vehicle travels and a velocity control signal that instructs the driver vehicle 110 to travel at a velocity for avoiding a collision with the first peripheral vehicle. The secondary vehicle control signal may further include a velocity control signal as mentioned above.

The velocity control signal that instructs the driver vehicle 110 to travel at a velocity for avoiding a collision with the first peripheral vehicle may be used to reduce the velocity of the driver vehicle 110 so as to avoid a collision with the first peripheral vehicle B 610 when the driver vehicle 110 changes lanes by moving to the second adjacent lane 310b as illustrated in FIG. 7 for example, but is not limited thereto.

Figure 8:
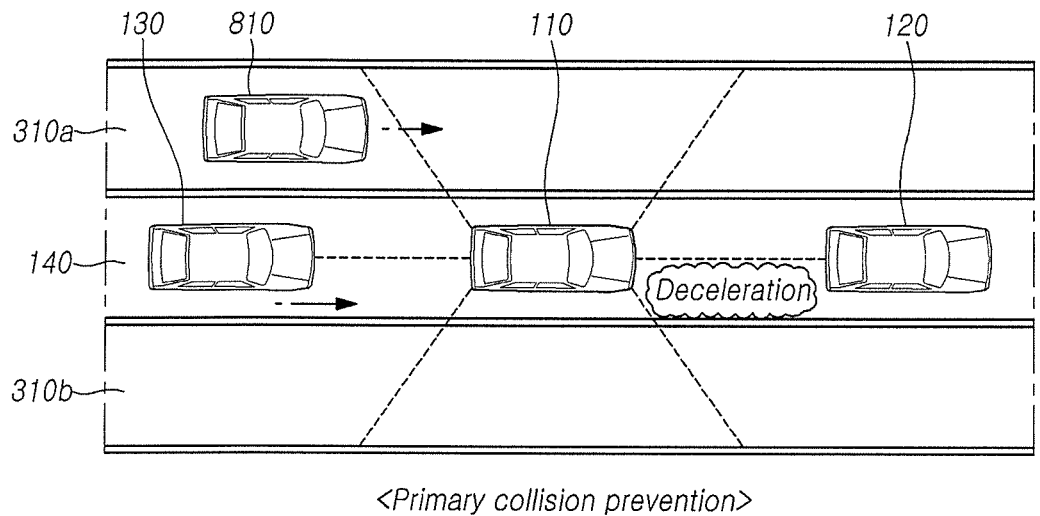
FIG. 8 illustrates an exemplary situation in which a driver vehicle is avoidance-controlled when a second peripheral vehicle exists.
Figure 8:
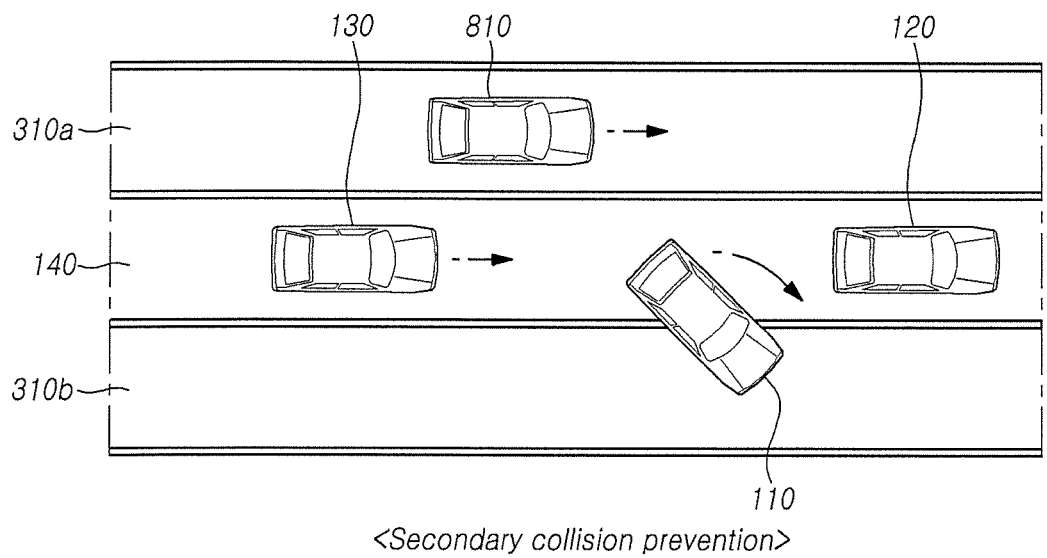

FIG. 8 illustrates an exemplary situation in which the driver vehicle 110 is avoidance-controlled when a second peripheral vehicle 810 exists.

Referring to FIG. 3 and FIG. 8, as described above, at least one second sensor 220 included in the vehicle collision avoidance control device 200 mounted on the driver vehicle 110 may sense the second direction of the driver vehicle 110 at a predetermined angle and may sense a second peripheral vehicle 810 traveling in at least one adjacent lane 310 that is adjacent to the traveling lane 140 of the driver vehicle 110.

Although there may be a single second peripheral vehicle 810 as illustrated in FIG. 8, the same may refer to two or more vehicles which are different from the second target vehicle 130, and which are sensed in the adjacent lane 310 in the second direction.

The vehicle collision avoidance control device 200 included in the driver vehicle 110 may control the driver vehicle 110 in the method as described with reference to FIG. 5 with regard to the first target vehicle 120 and the second target vehicle 130.

When a second peripheral vehicle 810 exists, the controller 230 may generate a primary vehicle control signal for avoiding a primary collision. If a secondary collision is predicted as a result of sensing the second target vehicle 130 by at least one second sensor 220, the controller 230 may search for a peripheral lane to which the driver vehicle can move. Then, the controller 230 may remodify and output a secondary vehicle control signal including a lane change control signal that instructs the driver vehicle to make an avoidance movement to the discovered peripheral lane.

For example, the controller 230 generates an AEB control signal for braking the driver vehicle 110 in order to avoid a primary collision with the first target vehicle 120 that has stopped. When a second target vehicle 120 approaches behind the driver vehicle 110, and when a secondary collision between the driver vehicle 110 and the secondary target vehicle is predicted, the controller 230 searches for a lane to which the driver vehicle 110 can move, among the adjacent lanes 310a and 310b that are adjacent to the traveling lane 140 of the driver vehicle 110. In the second direction, no vehicle is sensed in the second adjacent lane 310b, and a second peripheral vehicle 810 is sensed in the first adjacent lane 310a. Accordingly, the controller 230 may output a secondary vehicle control signal including a lane change control signal that instructs the driver vehicle 110 to make a right turn and move to the second adjacent lane 310b.

As another example, the controller 230 may remodify and output the secondary vehicle control signal according to the result of sensing the second peripheral vehicle 810.

For example, when the first sensor 210 senses a first target vehicle 120 that has stopped, and when the controller 230 determines that there is a possibility of a primary collision with the first target vehicle 120, an AEB control signal is generated. When the controller 230 determines that there is a possibility of a secondary collision according to the result of sensing the second target vehicle 130, the controller 230 modifies the secondary vehicle control signal including a signal that controls the driver vehicle so as to change lanes by moving to the first adjacent lane 310a. However, since there exists a second peripheral vehicle 810 traveling in the first adjacent lane 310a, a movement of the driver vehicle 110 to the first adjacent lane 310a is likely to cause a collision with the second peripheral vehicle 810. Accordingly, the controller 230 may remodify the second vehicle control signal so as to include a signal that controls the driver vehicle 110 so as to change lanes by moving to the second adjacent lane 310b.

The primary vehicle control signal may include a velocity control signal for reducing the velocity of the driver vehicle 110 or braking the driver vehicle 110, and the remodified secondary vehicle control signal may include a lane change control signal for moving the driver vehicle 110 from the traveling lane 140 to the peripheral lane 310b that is different from the peripheral lane 310a in which the second peripheral vehicle 810 travels. The secondary vehicle control signal may further include a velocity control signal, as described above.

As described above, the peripheral lane may have the same meaning as the adjacent lane 310 that is adjacent to the traveling lane 140 of the driver vehicle 110.

Figure 9:
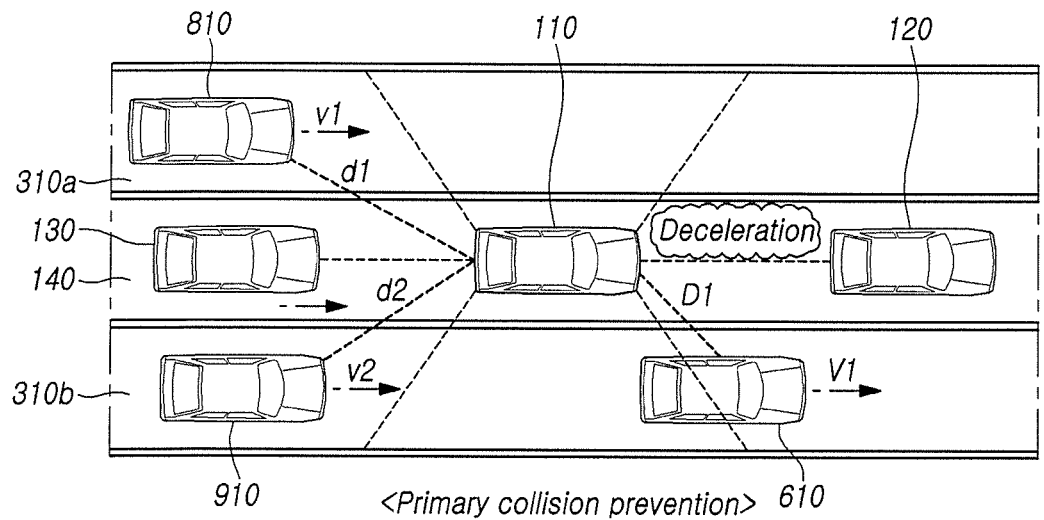
FIG. 9 illustrates an exemplary situation in which a driver vehicle moves from the traveling lane to the lane of the second peripheral vehicle.
Figure 9:
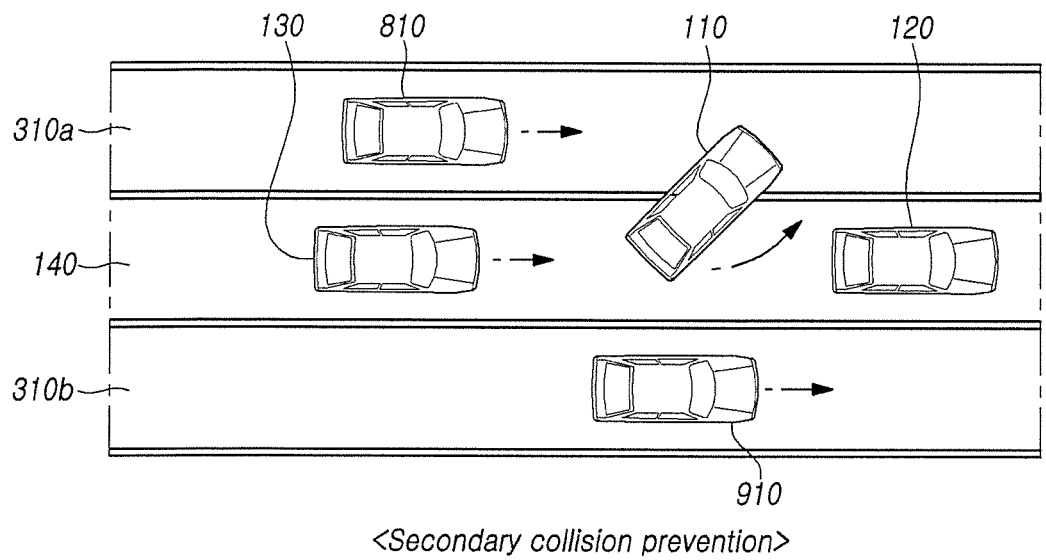

FIG. 9 illustrates an exemplary situation in which the driver vehicle 110 moves from the traveling lane to the lane of the second peripheral vehicle 810.

Referring to FIG. 9, when second peripheral vehicles 810 and 910 exist in both adjacent lanes 310 that are adjacent to the traveling lane 140 of the driver vehicle 110, the driver vehicle 110 may have to change lanes by moving to the first adjacent lane 310a or to the second adjacent lane 310b, according to the situation.

The second peripheral vehicles 810 and 910 may refer to all of the two or more vehicles as described above. In order to distinguish the second peripheral vehicles 810 and 910, it will be assumed in the following description that the second peripheral vehicle traveling in the first adjacent lane 310a is referred to as a second peripheral vehicle A 810, and the second peripheral vehicle traveling in the second adjacent lane 310b is referred to as a second peripheral vehicle B 910.

In this case, the controller 230 may generate a primary vehicle control signal for avoiding a primary collision as described above with reference to FIG. 8. If a secondary collision is predicted as a result of sensing the second target vehicle 130 by at least one second sensor 220, the controller 230 may search for a peripheral lane to which the driver vehicle can move. Then, the controller 230 may remodify and output a secondary vehicle control signal including a lane change control signal that instructs the driver vehicle 110 to make an avoidance movement to the discovered peripheral lane.

It will be assumed for example that the relative velocity of the second peripheral vehicle B 910 is higher than the relative velocity of the second peripheral vehicle A 810 (v1<v2): the controller 230 generates an AEB control signal for braking the driver vehicle 110 in order to avoid a primary collision with the first target vehicle 120 that has stopped. When a secondary collision between the driver vehicle 110 and the secondary target vehicle 130 is predicted, the controller 230 searches for a lane to which the driver vehicle 110 can move, among the adjacent lanes 310a and 310b that are adjacent to the traveling lane 140 of the driver vehicle 110. In the second direction, the second peripheral vehicle A 810 traveling in the first adjacent lane 310a and the second peripheral vehicle B 910 traveling in the second adjacent lane 310b are both sensed. In this case, the relative velocity of the second peripheral vehicle A 810 and the relative velocity of the second adjacent lane 310b may be measured and compared by the second sensor 210 and the controller 230. The first adjacent lane 310a corresponding to the second peripheral vehicle A 810 having a lower relative velocity may be found as the peripheral lane to which the driver vehicle can move. A secondary vehicle control signal then may be remodified and output, which includes a lane change control signal that instructs the driver vehicle to make a left turn and to make an avoidance movement to the first adjacent lane 310a.

In the above-mentioned example, it is possible to search for the lane to which the driver vehicle can move by using the relative distance or position between the driver vehicle 110 and the second peripheral vehicle A 810 or the relative distance or position between the driver vehicle 110 and the second peripheral vehicle B 910, instead of the relative velocity of the second peripheral vehicle A 810 and the relative velocity of the second peripheral vehicle B 910. That is, a radar sensor may be used to measure the relative distance or position between the driver vehicle 110 and the second peripheral vehicles 810 and 910 from signals received after being reflected from the second peripheral vehicles 810 and 910. With reference to FIG. 7 and the relative positions, the first adjacent lane 310a corresponding to the second peripheral vehicle A 810, which is positioned comparatively farther than the driver vehicle 110, is found as the lane to which the driver vehicle can move.

The primary vehicle control signal may include a velocity control signal for reducing the velocity of the driver vehicle 110 or braking the driver vehicle 110, and the remodified secondary vehicle control signal may include a lane change control signal for moving the driver vehicle 110 from the traveling lane 140 to the peripheral lane in which a second peripheral vehicle travels and a velocity control signal that instructs the driver vehicle 110 to travel at a velocity for avoiding a collision with the second peripheral vehicle. The secondary vehicle control signal may further include a velocity control signal as mentioned above.

The velocity control signal that instructs the driver vehicle 110 to travel at a velocity for avoiding a collision with the second peripheral vehicle may be used to increase the velocity of the driver vehicle 110 so as to avoid a collision with the second peripheral vehicle A 810 when the driver vehicle 110 changes lanes by moving to the first adjacent lane 310a as illustrated in FIG. 9 for example, but is not limited thereto.

Figure 10:
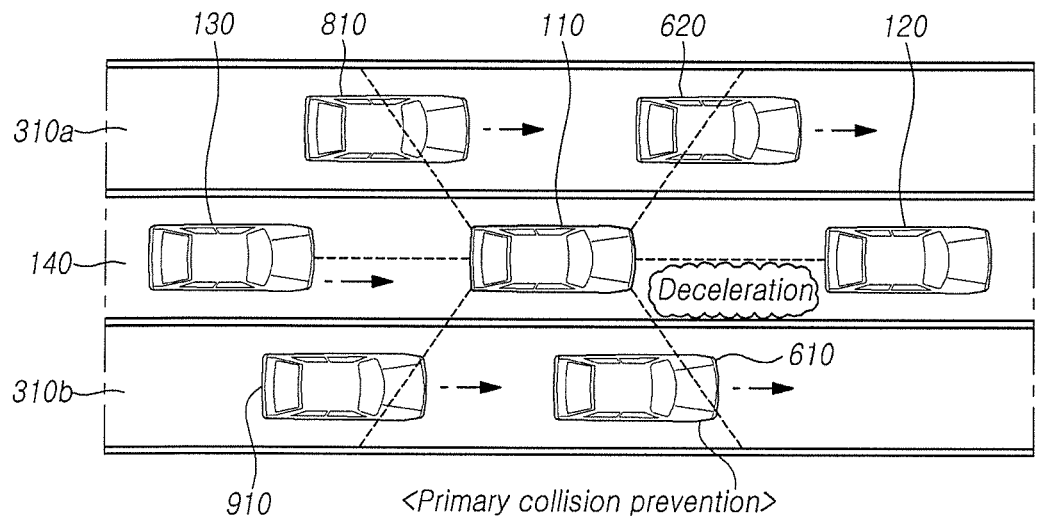
FIG. 10 illustrates an exemplary situation in which hazard lights of the driver vehicle are turned on without changing lanes.
Figure 10:
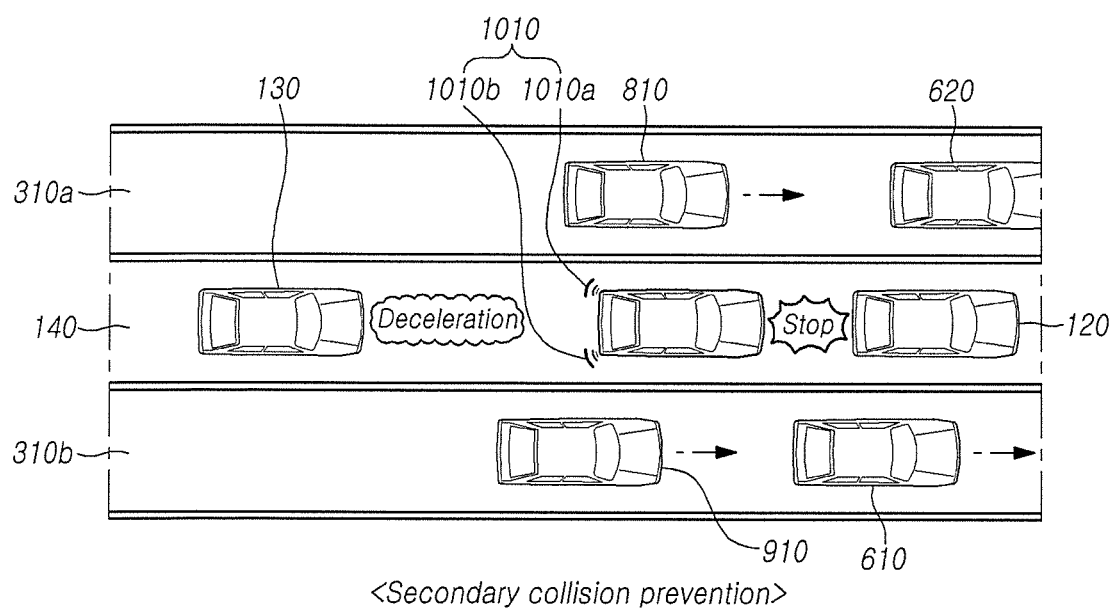

FIG. 10 illustrates an exemplary situation in which hazard lights 1010 of the driver vehicle 110 are turned on without changing lanes.

Referring to FIG. 10, when no peripheral lane to which the driver vehicle 110 can move is found, the controller 230 may remodify and output a secondary vehicle control signal including a control signal for turning on the hazard lights 1010 of the driver vehicle 110.

For example, as described above, the controller 230 primarily generates an AEB control signal in order to avoid a primary collision with the first target vehicle 120 and searches for a peripheral lane to which the driver vehicle can move, in order to avoid a collision with the second target vehicle 130. A first peripheral vehicle A 620 and a second peripheral vehicle B 810 travel in the first adjacent lane 310a, and a first peripheral vehicle B 610 and a second peripheral vehicle B 910 travel in the second adjacent lane 310b. The first peripheral vehicles 610 and 620 and the second peripheral vehicles 810 and 910 are positioned in the adjacent lanes 310 in such a manner that, if the driver vehicle 110 changes lanes, there is a high possibility of collision. Therefore, the controller 230 determines that no peripheral lane has been found, to which the driver vehicle can move. Consequently, the controller 230 may output a control signal for turning on the hazard lights 1010 of the driver vehicle in order to attract the attention of the second target vehicle 130.

Figure 11:
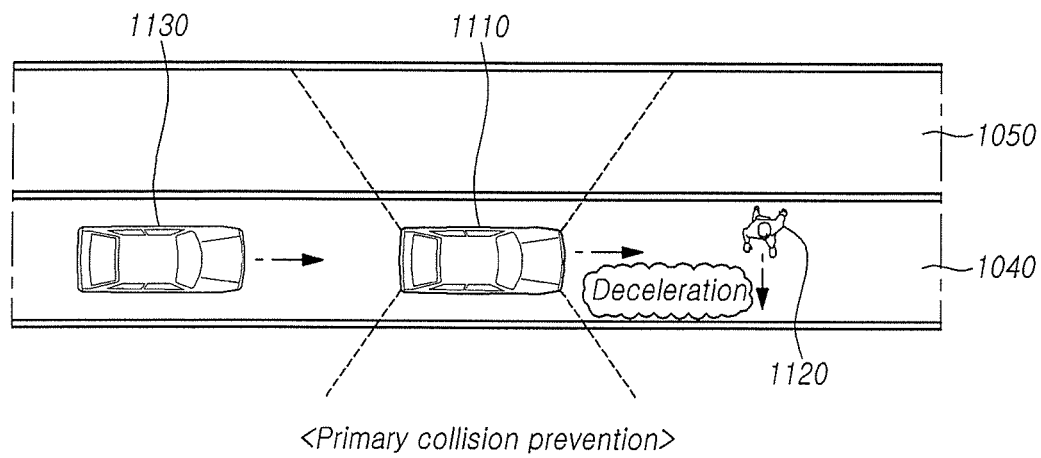
FIG. 11 illustrates an exemplary situation in which a driver vehicle is avoidance-controlled with regard to a first target and a second target.
Figure 11:
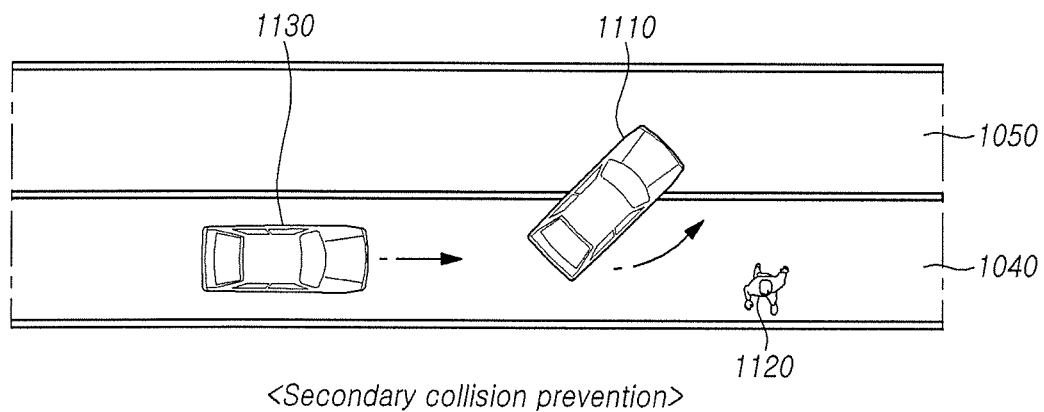

FIG. 11 illustrates an exemplary situation in which the driver vehicle is avoidance-controlled with regard to a first target and a second target.

Referring to FIG. 2B and FIG. 11, the vehicle collision avoidance control device 200 according to the present disclosure includes: at least one first sensor 210 that senses a first direction of the driver vehicle 1110 and senses a first target vehicle 1120 in the first direction of the driver vehicle 1110; at least one second sensor 220 that senses a second direction, which is opposite to the first direction of the driver vehicle, and senses a second target vehicle 1130 in the second direction of the driver vehicle 1110; and a controller 230 which generates a primary vehicle control signal for avoiding a primary collision when a primary collision with the first target 1120 is predicted according to the first direction sensing result by the at least one sensor 210, which modifies the primary vehicle control signal into a secondary vehicle control signal on the basis of the result of sensing the second target 1130 by the at least one second sensor 220, and which outputs the secondary vehicle control signal.

Descriptions of the first sensor 210, the second sensor 220, and the controller 230 may be identical to those given with reference to FIG. 2A to FIG. 10, respectively.

The first target 1120 may be one selected from a first target vehicle, a first pedestrian, and a first obstacle, and the second target 1130 may be one selected from a second target vehicle, a second pedestrian, and a second obstacle.

It will be assumed for example that the first target 1120 is a pedestrian who crosses the road, and the second target 1130 is a vehicle traveling behind the driver vehicle 1110.

Meanwhile, the vehicle collision avoidance control device according to the present disclosure may differently configure the output timing of a control signal for controlling the velocity of the vehicle according to the result of sensing the first target and the second target.

For example, the above-mentioned primary vehicle control signal may include a first velocity control signal for reducing the velocity of the driver vehicle or braking the driver vehicle, the output timepoint of which is determined on the basis of a first reference TTC (Time-To-Collision), and the secondary vehicle control signal may include a second velocity control signal for reducing the velocity of the driver vehicle or braking the driver vehicle, the output timepoint of which is determined on the basis of a second reference TTC. The first reference TTC and the second reference TTC may be configured to have different values.

Specifically, the vehicle may include an emergency braking control system that controls the vehicle so as to initiate a braking operation automatically when it is predicted that the vehicle will collide with a first target sensed in front of the vehicle. In this case, the controller continuously calculates the TTC with regard to the first target in front of the vehicle for the purpose of emergency braking of the vehicle and, when the calculated TTC reaches a predetermined first reference TTC, outputs a control signal for reducing the velocity of the vehicle.

Therefore, in the present disclosure, different values may be assigned to reference TTCs for determining the output timing of vehicle control signals output by the controller according to whether the first target and the second target are sensed or not.

For example, the output timing of the primary vehicle control signal is determined on the basis of the first reference TTC, and the output timing of the secondary vehicle control signal is determined on the basis of the second TTC. The first reference TTC value is preferably set to be longer than the second reference TTC value.

This is for the purpose of providing a sufficient time for the second target to recognize the front situation by delaying the time to reduce the vehicle velocity or to brake the vehicle as much as possible, even if a collision between the vehicle and the first target is predicted. Even if the vehicle control signal output timing may be set differently as described above, the time to generate a signal for allowing the second target to recognize the front situation, such as hazard lights, may be set identically.

For example, even if the output timing of the second vehicle control signal is determined on the basis of the second reference TTC, the vehicle may initiate a hazard light operation for informing the second target, which has been sensed behind the vehicle, of the front situation, if the first reference TTC is reached. Such a difference between the timepoint at which the velocity of the driver vehicle is reduced and the timepoint at which a guide signal is generated to guide the rear vehicle to reduce velocity can minimize the possibility of a collision with the first target and can also minimize the possibility of a collision with the second target.

Figure 12:
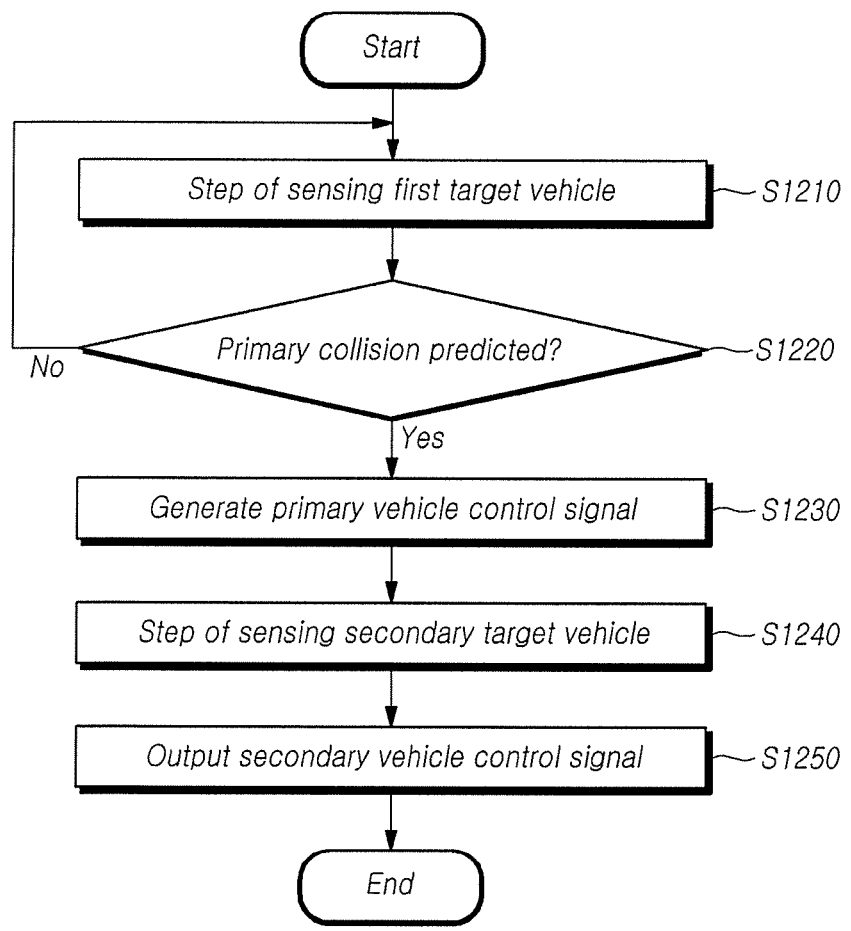
FIG. 12 is a flowchart of a vehicle collision avoidance control method according to the present disclosure.

FIG. 12 is a flowchart of a vehicle collision avoidance control method according to the present disclosure.

Referring to FIG. 12, the vehicle collision avoidance control method according to the present disclosure may include the steps of: sensing the first direction of the driver vehicle by at least one sensor and sensing a first target in the first direction of the driver vehicle (S1210); generating a primary vehicle control signal for avoiding the primary collision (S1230), when a primary collision with the first target vehicle is predicted by the controller according to the first direction sensing result by the at least one first sensor (S1220); sensing the second direction, which is opposite to the first direction of the driver vehicle, by at least one second sensor and sensing a second target vehicle in the second direction of the driver vehicle (S1240); and modifying the primary vehicle control signal into a secondary vehicle control signal by the controller on the basis of the second direction sensing result by the at least one second sensor and outputting the secondary vehicle control signal (S1250).

The operation method or content regarding respective steps (S1210, S1220, S1230, S1240, and S1250) is identical to the above description made with reference to FIG. 2A to FIG. 10, and repeated description thereof will be omitted herein.

As described above, according to the present disclosure, it is possible to provide a vehicle collision avoidance device and a method for controlling the same, wherein vehicle collision risks both in the traveling direction and in the opposite direction of the traveling direction can be prevented, thereby securing traveling safety.

In addition, according to the present disclosure, it is possible to provide a vehicle collision avoidance device and a method for controlling the same, wherein, by preventing a series of rear-end collisions, smooth traffic flow or vehicle traveling is guaranteed, thereby reducing fuel consumption and the amount of exhaust gas.

Meanwhile, the vehicle may include at least one selected from the above-mentioned camera module 11, the non-image sensor module 12, the communication module 13, and the vehicle inside sensor module 140. This has already been described with reference to FIG. 1, and repeated description thereof will be omitted therein.

In addition, the vehicle may include a domain control unit 20.

The domain control unit (DCU) 20 may be configured to receive image data captured by at least one image sensor, to receive sensing data captured by multiple non-image sensors, and to process at least one selected from the image data and the sensing data. For such processing, the domain control unit 20 may include at least one processor.

Alternatively, the domain control unit 20 may transmit/receive data with at least module selected from a camera module 11, a non-image sensor module 12, a communication module 130, a vehicle inside sensor module 14, and a driver assist system module 21 and may process data received through the same. That is, the domain control unit 20 may be provided inside the vehicle so as to communicate with at least one module mounted inside the vehicle. To this end, the domain control unit 20 may further include an appropriate data link or communication link, such as a vehicle network bus, for data transmission or signal communication.

The domain control unit 20 may operate to control at least one of various driver assist systems (DAS) used for the vehicle. For example, the domain control unit 20 may determine a specific situation, a condition, an event occurrence, and a control operation execution on the basis of data acquired from at least one of the above-mentioned modules 11, 12, 13, 14, and 21.

The domain control unit 20 may transmit a signal for controlling the operation of various driver assist system modules 21 configured inside the vehicle by using determined information or the like. For example, the driver assist system modules 21 may include a blind spot detection (BSD) system module 21a, a lane keeping assist system (LAKA) module 21a, and an adaptive smart cruise control (ASCC) system module 21c. Various other driver assist system modules 21 may be configured in the vehicle, such as a lane departure warning system (LDWS), a lane change assist system (LCAS), a parking assist system (PAS), and an emergency braking control system (AEB). The terms and names of driver assist systems described herein are disclosed as examples, and are not limited thereto. In addition, the driver assist system modules 21 may include an autonomous traveling module for autonomous traveling. Alternatively, the domain control unit may control the vehicle so as to perform autonomous driving through control of individual system modules included in the driver assist system modules 21.

The present disclosure with regard to the domain control unit, as described above, will now be described briefly.

Figure 13:
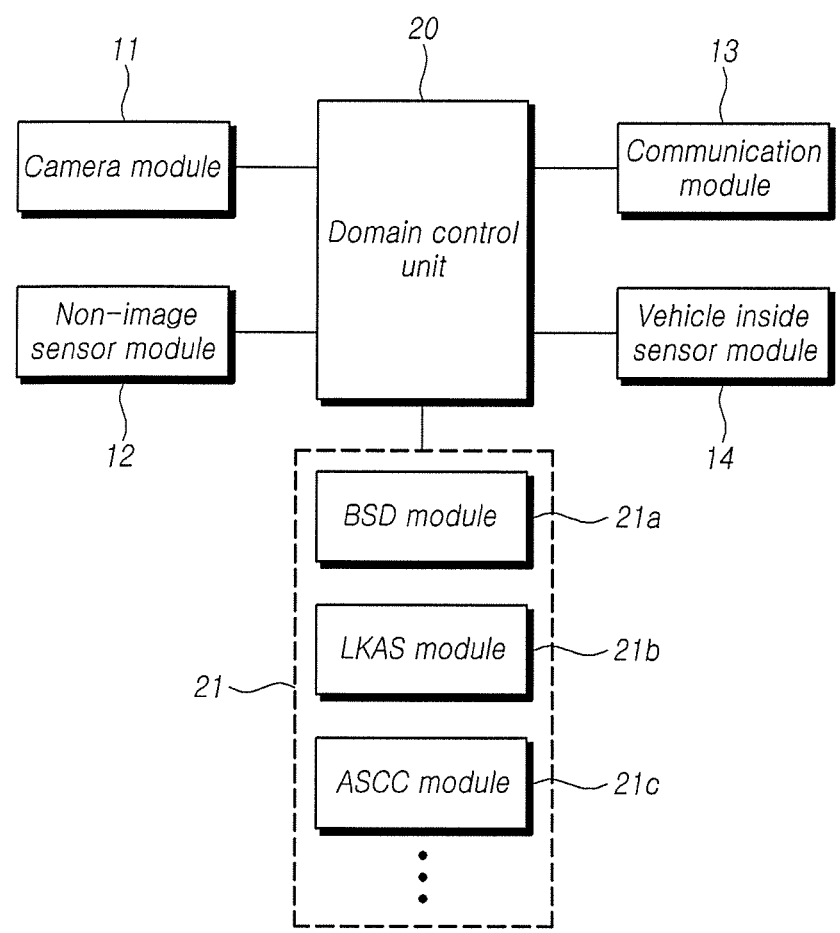
FIG. 13 is a block diagram of a vehicle collision avoidance control system according to the present disclosure.

FIG. 13 is a block diagram of a vehicle collision avoidance control system according to the present disclosure.

Referring to FIG. 13, the vehicle collision avoidance control system may include: at least one first sensor that senses the first direction of the driver vehicle and senses a first target vehicle in the first direction of the driver vehicle; at least one second sensor that senses the second direction, which is opposite to the first direction of the driver vehicle, and senses a second target vehicle in the second direction of the driver vehicle; an emergency braking control module configured to perform a collision avoidance operation upon sensing a possibility that the driver vehicle will collide with another vehicle; and a domain control unit 20 configured to process the sensing results by the first sensor and the second sensor and to control at least one driver assist system module 21 provided on the driver vehicle, including the emergency braking control module configured to perform a collision avoidance operation upon sensing a possibility that the driver vehicle will collide with another vehicle.

As described above, furthermore, at least one sensor selected from the first sensor and the second sensor may be a camera module 11 which is arranged on the driver vehicle so as to have a field of view regarding the outside of the driver vehicle, and which is configured to capture image data and to process the captured image data. Alternatively, at least one sensor selected from the first sensor and the second sensor may be a non-image sensor module 12 which is arranged on the driver vehicle so as to have a sensing area regarding the outside of the driver vehicle, and which is configured to capture sensing data and to process the captured sensing data. In addition, the emergency braking control module may be included in the driver assist system module 21. Besides, the vehicle collision avoidance control system may include a communication module 13 and a vehicle inside sensor module 14 as needed.

In this case, the domain control unit 20 may control at least one driver assist system module 21 so as to generate a primary vehicle control signal for avoiding a primary collision when a primary collision with the first target vehicle is predicted according to the first direction sensing result by at least one first sensor, to modify the primary vehicle control signal into a secondary vehicle control signal on the basis of the result of sensing the second target vehicle by at least one second sensor, and to output the secondary vehicle control signal.

Furthermore, the domain control unit 20 may control the driver assist system module 21 so as to perform each embodiment described above.

Meanwhile, the primary vehicle control signal may include a velocity control signal for reducing the velocity of the driver vehicle or braking the driver vehicle, and the secondary vehicle control signal may include a lane change control signal for changing the traveling lane of the driver vehicle.

Alternatively, the primary vehicle control signal may include a first velocity control signal for reducing the velocity of the driver vehicle or braking the driver vehicle, the output timepoint of which is determined on the basis of a first reference TTC, and the secondary vehicle control signal may include a second velocity control signal for reducing the velocity of the driver vehicle or braking the driver vehicle, the output timepoint of which is determined on the basis of a second reference TTC. The first reference TTC and the second reference TTC may be configured to have different values.

Figure 14:
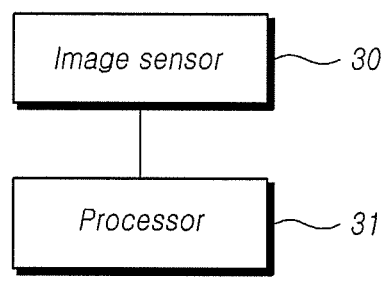
FIG. 14 is a block diagram of a camera module according to the present disclosure.

FIG. 14 is a block diagram of a camera module according to the present disclosure.

Referring to FIG. 14, the camera module may include: an image sensor 30 arranged on the vehicle so as to have a field of view regarding the first direction of the vehicle and the second direction, which is opposite to the first direction, and configured to capture image data; and a processor 31 configured to process image data captured by the image sensor 30.

The image sensor 30 may refer to a device for converting light (image information) introduced through a camera lens into an electric digital signal. For example, the image sensor 30 may refer to a CCD (Charge Coupled Device) that directly transmits electron-type signals. Alternatively, the image sensor 30 may refer to a COMS (Complementary Metal Oxide Semiconductor) image sensor that convers a signal into a voltage type and transmits the same.

As described above, the image sensor 30 may be arranged on the vehicle so as to have a field of view regarding the inside or outside of the vehicle. At least one image sensor 30 may be mounted on each part of the vehicle so as to have a field of view regarding the front portion, side portion, or rear portion of the vehicle.

Image data captured by the image sensor 30 may be generated in a format selected from raw-type AVI, MPEG-4, H.264, DivX, and JPEG, for example. Image data captured by the image sensor 30 may be processed by the processor 31.

The processor 31 may operate so as to process the image data captured by the image sensor 30. As an example, the image data processing operation may be processed by a processor included in the camera module. As another example, the image data may also be processed by the above-mentioned controller 10 or the domain control unit 20.

For example, the processor 31 may process data read by the image sensor 30 into a high-quality image through various calculations. If necessary, the processor 31 may process the image data and may perform operations such as target sensing, distance measuring, and target classification.

Meanwhile, the image data may be used to sense the first target vehicle in the first direction and to sense the second target vehicle in the second direction.

In addition, the image data may be used to generate a primary vehicle control signal for avoiding a primary collision when a primary collision between the driver vehicle and the first target vehicle is predicted according to the first direction sensing result, to modify the primary vehicle control signal into a secondary vehicle control signal on the basis of the result of sensing the second target vehicle, and to output the secondary vehicle control signal. Besides, the image data is used to perform each embodiment described in this specification.

The present embodiments described above may be implemented through various means. For example, the present embodiments may be implemented by hardware, firmware, software, or a combination thereof.

In the case of implementation by hardware, the present embodiments may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, and microprocessors.

In the case of implementation by firmware or software, the present embodiments may be implemented as a device, a procedure, or a function which performs the above-described functions or operations. Software codes may be stored in a memory unit and may be driven by a processor. The memory unit may be positioned inside or outside the processor and may exchange data with the processor by various means already known widely.

In addition, terms such as "system", "processor", "controller", "component", "module", "interface", "model", and "unit" may generally refer to computer-related entity hardware, a combination of hardware and software, software, or software that is being executed. For example, the above-mentioned elements may be a process driven by a processor, a processor, a controller, a control processor, an entity, an execution thread, a program, and/or a computer, but are not limited thereto. For example, an application that is being executed by a controller or a processor, and a controller or a processor may all be elements. At least one element may exist inside a process and/or an execution thread, and the element may be positioned in a single system or may be distributed over two or more systems.

The above description and the accompanying drawings are merely exemplary expressions of the technical idea of the present disclosure, and a person skilled in the art to which the present disclosure pertains could variously modify and change the configuration, for example, couple, separate, substitute, and adapt the same, without departing from the essential characteristics of the present disclosure. Therefore, embodiments disclosed in the present disclosure are not for the purpose of limiting the technical idea of the present disclosure, but are for the purpose of description, and the scope of the technical idea of the present disclosure is not limited by such embodiments. That is, within the intended scope of the present disclosure, one or more of all elements thereof may be coupled selectively and may operate accordingly. The scope of protection of the present disclosure is to be interpreted by the accompanying claims, and any technical idea falling in the equivalent range is to be interpreted as being included in the claimed scope of the present disclosure.

What is claimed is:

1. A vehicle collision avoidance control device comprising:
   a first sensor configured to sense objects in a first direction of a driver vehicle;
   a second sensor configured to sense objects in a second direction of the driver vehicle, the second direction being opposite to the first direction; and
   a controller configured to:
      receive sensing data from the first and second sensors;
      determine a possibility of a primary collision with a first object based on sensing data from only the first sensor, from among the first and second sensors;
      generate, if the possibility of the primary collision is determined and before determination of a sensing result from the second sensor, a primary control signal for reducing a speed of the driver vehicle to avoid a primary collision based on sensing data from only the first sensor, from among the first and second sensors;
      after initiating control of the driver vehicle according to the primary control signal, generate, in response to a detection of a second object in the second direction based on sensing data from the second sensor and a possibility of a second collision with the second object, a secondary control signal different from the primary control signal and generated based on sensing data from the second sensor; and
      output the secondary control signal to control the driver vehicle,
   wherein a time at which the primary control signal is output is determined based on a first reference TTC (Time-To-Collision) with respect to the first object,
   the secondary control signal comprises a speed control signal for reducing the speed of the driver vehicle,
   a time at which the speed control signal is output is determined based on a second reference TTC with respect to the second object, and
   the first reference TTC and the second reference TTC are set to have different values.

2. The vehicle collision avoidance control device of claim 1, wherein at least one sensor selected from the first sensor and the second sensor is an image sensor mounted to the driver vehicle and configured to capture and process image data outside the vehicle in a respective direction.

3. The vehicle collision avoidance control device of claim 1, wherein at least one sensor selected from the first sensor and the second sensor is a RADAR, LIDAR, or ultrasonic sensor mounted to the driver vehicle and configured to capture and process sensing data outside the driver vehicle in a respective direction.

4. The vehicle collision avoidance control device of claim 1, wherein the secondary control signal comprises a steering control signal for changing a travel path of the driver vehicle.

5. The vehicle collision avoidance control device of claim 1, wherein the first sensor is further configured to sense a first peripheral object traveling in a first adjacent travel path that is adjacent to the travel path of the driver vehicle, and the controller is configured to generate the secondary control signal in response to a determination that the first peripheral object is present in the first adjacent travel path and output the secondary control signal.

6. The vehicle collision avoidance control device of claim 5, wherein the secondary control signal comprises a steering control signal for moving the driver vehicle from the travel path to a second adjacent travel path which is different from the first adjacent travel path.

7. The vehicle collision avoidance control device of claim 5, wherein the secondary control signal further comprises a steering control signal for moving the driver vehicle from the travel path to the first adjacent travel path, and the speed control signal of the secondary control signal is used to change the speed of the driver vehicle to a speed for avoiding a collision with the first peripheral object.

8. The vehicle collision avoidance control device of claim 1, wherein the second sensor is further configured to sense a second peripheral object traveling in a first adjacent travel path that is adjacent to the travel path of the driver vehicle, and the controller is configured to generate the secondary control signal in response to a determination that the second peripheral object is present in the first adjacent travel path and output the secondary control signal.

9. The vehicle collision avoidance control device of claim 8, wherein the secondary control signal comprises a steering control signal for moving the driver vehicle from the travel path to a second adjacent travel path which is different from the first adjacent travel path.

10. The vehicle collision avoidance control device of claim 8, wherein the secondary control signal further comprises a steering control signal for moving the driver vehicle from the travel path to the first adjacent travel path, and the speed control signal of the secondary control signal is used to change the speed of the driver vehicle to a speed for avoiding a collision with the second peripheral object.

11. The vehicle collision avoidance control device of claim 1, wherein the controller is configured to search for an adjacent travel path to which the driver vehicle can move without collision in response to a determination of the possibility of a second collision with the second object if the driver vehicle is controlled according to the primary control signal, and the controller is configured to generate the secondary control signal to comprise a steering control signal for moving the driver vehicle to the adjacent travel path and output the secondary control signal.

12. The vehicle collision avoidance control device of claim 11, wherein the controller is configured to generate the secondary control signal to comprise a control signal for turning on hazard lights of the driver vehicle if no adjacent lane to which the driver vehicle can move without collision is found and output the secondary control signal.

13. The vehicle collision avoidance control device of claim 1, wherein the first reference TTC is set to be longer than the second reference TTC.

14. A vehicle collision avoidance control method comprising:

sensing, by a first sensor, a first object in a first direction of a driver vehicle;

generating, by a processor before determination of a sensing result from a second sensor configured for sensing in a second direction that is opposite to the first direction, a primary control signal for avoiding a primary collision with the first object based on sensing data from only the first sensor, from among the first and second sensors, and outputting the primary control signal to a vehicle controller;

sensing, by the second sensor, a second object in the second direction that is opposite to the first direction; and after initiating control of the driver vehicle based on the primary control signal, generating, by the processor, a secondary control signal different from the primary control signal based on sensing data from the second sensor, for avoiding a secondary collision with the second object; and outputting, by the processor, the secondary vehicle control signal to the vehicle controller, wherein a time at which the primary control signal is output is determined based on a first reference TTC (Time-To-Collision) with respect to the first object, the secondary control signal comprises a speed control signal for reducing the speed of the driver vehicle, a time at which the speed control signal is output is determined based on a second reference TTC with respect to the second object, and the first reference TTC and the second reference TTC are set to have different values.

15. A vehicle collision avoidance control system comprising:

a first sensor configured to sense a first object in a first direction of a driver vehicle;

a second sensor configured to sense a second object in a second direction that is opposite to the first direction; and a controller configured to:

process sensing results by the first sensor and the second sensor and configured to control at least one driver assist system module provided in the driver vehicle, perform a collision avoidance operation when the driver vehicle is predicted to collide with a different vehicle, control the at least one driver assist system module to, before determination of a sensing result from the second sensor, generate a primary control signal for reducing a speed of the driver vehicle to avoid a primary collision when a primary collision with the first object is predicted according to a first sensing result based on sensing data from only the first sensor, from among the first and second sensors, after initiating control of the driver vehicle according to the primary control signal, generate a secondary control signal different from the primary control signal when a secondary collision with the second object is predicted based on sensing data from the second sensor, and output the secondary control signal, wherein a time at which the primary control signal is output is determined based on a first reference TTC (Time-To-Collision) with respect to the first object, the secondary control signal comprises a speed control signal for reducing the speed of the driver vehicle, a time at which the speed control signal is output is determined based on a second reference TTC with respect to the second object, and the first reference TTC and the second reference TTC are set to have different values.

16. The vehicle collision avoidance control system of claim 15, wherein the secondary control signal comprises a steering control signal for changing a travel path of the driver vehicle.

17. The vehicle collision avoidance control device of claim 1, further comprising:
a third sensor configured to sense a third direction of the driver vehicle, the third direction being perpendicular to the first direction and the second direction,
wherein the controller is configured to:
output the primary control signal based on sensing data from the first sensor,
generate the secondary control signal based on sensing data from the second and third sensors, and
output the secondary control signal to control the driver vehicle.

18. A vehicle collision avoidance system, comprising:
a first sensor mounted to a vehicle and configured to sense objects in front of the vehicle;
a second sensor configured to sense objects behind the vehicle; and
a controller configured to:
determine a possibility of a primary collision with a first object in front of the vehicle based on sensing data received from only the first sensor, from among the first and second sensors;
generate, if the possibility of the primary collision is determined and before determination of a sensing result from the second sensor, a primary control signal including a speed control signal for reducing a speed of the vehicle to avoid the primary collision based on the sensing data received from only the first sensor, from among the first and second sensors;
following initiating control of the vehicle based on the primary control signal, determine a possibility of a secondary collision with a second object from behind the vehicle based on sensing data received from the second sensor;
generate, if the possibility of the secondary collision is determined, a secondary control signal different from the primary control signal, generated based on the sensing data received from the second sensor, and including a steering control signal for steering the vehicle in a direction different from an original direction of travel before the primary collision signal was generated; and
output the secondary control signal to control the vehicle,
wherein a time at which the primary control signal is output is determined based on a first reference TTC (Time-To-Collision) with respect to the first object,
the secondary control signal comprises a speed control signal for reducing the speed of the driver vehicle,
a time at which the speed control signal of the secondary control signal is output is determined based on a second reference TTC with respect to the second object, and
the first reference TTC and the second reference TTC are set to have different values.

19. The vehicle collision avoidance system of claim 18, wherein the controller is configured to generate the secondary control signal to activate hazard lights of the driver vehicle if no adjacent lane to which the driver vehicle can move without collision is found, and output the secondary control signal.

20. The vehicle collision avoidance system of claim 18, wherein the controller is configured to generate the secondary control signal in response to a determination that a first peripheral object is present in a first adjacent travel path and output the secondary control signal.

21. The vehicle collision avoidance system of claim 20, wherein the secondary control signal comprises a steering control signal for moving the driver vehicle from a travel path to a second adjacent travel path which is different from the first adjacent travel path.

22. The vehicle collision avoidance system of claim 20, wherein the secondary control signal comprises a steering control signal for moving the driver vehicle from a travel path to the first adjacent travel path, and the speed control signal of the secondary control signal is used to change the speed of the driver vehicle to a speed for avoiding a collision with a second peripheral object.

23. The vehicle collision avoidance control device of claim 1, wherein the controller is further configured to output the primary control signal to control the driver vehicle at a first timepoint different from a second timepoint at which the secondary control signal is output.

24. The vehicle collision avoidance control method of claim 14, further comprising outputting, by the processor, the primary control signal to the vehicle controller at a first timepoint different from a second timepoint at which the controller outputs the secondary control signal.

25. The vehicle collision avoidance control system of claim 15, wherein the controller is further configured to output the primary control signal to control the driver vehicle at a first timepoint different from a second timepoint at which the secondary control signal is output.

26. The vehicle collision avoidance system of claim 18, wherein the controller is further configured to output the primary control signal to control the vehicle at a first timepoint different from a second timepoint at which the secondary control signal is output.

* * * * *